United States Patent
Okihara et al.

(10) Patent No.: US 8,422,732 B2
(45) Date of Patent: Apr. 16, 2013

(54) INFORMATION PROCESSING APPARATUS, VERIFICATION APPARATUS, AND METHODS OF CONTROLLING THE SAME

(75) Inventors: Kenichi Okihara, Yokosuka (JP); Koji Harada, Yokohama (JP); Junichi Hayashi, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 12/955,517

(22) Filed: Nov. 29, 2010

(65) Prior Publication Data

US 2011/0158530 A1 Jun. 30, 2011

(30) Foreign Application Priority Data

Dec. 25, 2009 (JP) ................................. 2009-296390
Oct. 13, 2010 (JP) ................................. 2010-230700

(51) Int. Cl.
*G06K 9/00* (2006.01)
(52) U.S. Cl.
USPC .......... 382/100; 382/135; 382/137; 340/5.52; 340/5.53; 340/5.86; 356/71
(58) Field of Classification Search ........................ None
See application file for complete search history.

(56) References Cited

U.S. PATENT DOCUMENTS

| | | | | |
|---|---|---|---|---|
| 4,932,066 A * | 6/1990 | Nakayama et al. | ........... | 382/236 |
| 5,369,505 A | 11/1994 | Wantanabe et al. | | |
| 5,499,294 A | 3/1996 | Friedman | ........................ | 380/10 |
| 5,875,249 A * | 2/1999 | Mintzer et al. | ................... | 380/54 |
| 6,005,936 A * | 12/1999 | Shimizu et al. | ................ | 713/176 |
| 6,125,357 A * | 9/2000 | Pintsov | .......................... | 705/408 |
| 6,411,392 B1 * | 6/2002 | Bender et al. | ................. | 358/1.14 |
| 6,532,541 B1 * | 3/2003 | Chang et al. | ................... | 713/176 |
| 6,721,439 B1 * | 4/2004 | Levy et al. | ...................... | 382/100 |
| 6,766,056 B1 * | 7/2004 | Huang et al. | ................... | 382/190 |
| 6,963,655 B1 * | 11/2005 | Tonegawa et al. | ............. | 382/100 |
| 7,190,806 B2 * | 3/2007 | Cazier | ........................... | 382/100 |
| 7,313,248 B2 * | 12/2007 | Tonisson | ........................ | 382/100 |
| 7,849,317 B2 * | 12/2010 | Euchner et al. | ................ | 713/176 |
| 2001/0030759 A1 * | 10/2001 | Hayashi et al. | ................. | 358/1.9 |
| 2003/0147547 A1 * | 8/2003 | Lin et al. | ........................ | 382/100 |
| 2005/0123167 A1 * | 6/2005 | Maeno et al. | ................... | 382/100 |
| 2007/0071280 A1 * | 3/2007 | Fridrich et al. | ................ | 382/100 |
| 2008/0118100 A1 | 5/2008 | Hayashi | | |
| 2009/0324070 A1 * | 12/2009 | Hayashi | ........................ | 382/165 |
| 2009/0324099 A1 * | 12/2009 | Hayashi | ........................ | 382/209 |

\* cited by examiner

*Primary Examiner* — Claire X Wang
*Assistant Examiner* — Avinash J Yentrapati
(74) *Attorney, Agent, or Firm* — Fitzpatrick, Cella, Harper & Scinto

(57) ABSTRACT

An apparatus and method specify the presence/absence of an alteration and an alteration position of an image. A block-division unit divides image data into image data of a first unit including a predetermined number of pixels. A block calculation unit calculates an image data coefficient of the first unit. A cell-division unit divides one image data of the first unit into image data of a second unit. A cell calculation unit calculates an image data coefficient of the second unit. First verification data is generated by selecting two image data coefficients of the first unit and generating, for one pair, data representing the magnitude relation of the image data coefficients of the first unit. Second verification data is generated by selecting two image data coefficients of the second unit and generating, for one pair, data representing the magnitude relation of the image data coefficients of the second unit.

10 Claims, 20 Drawing Sheets

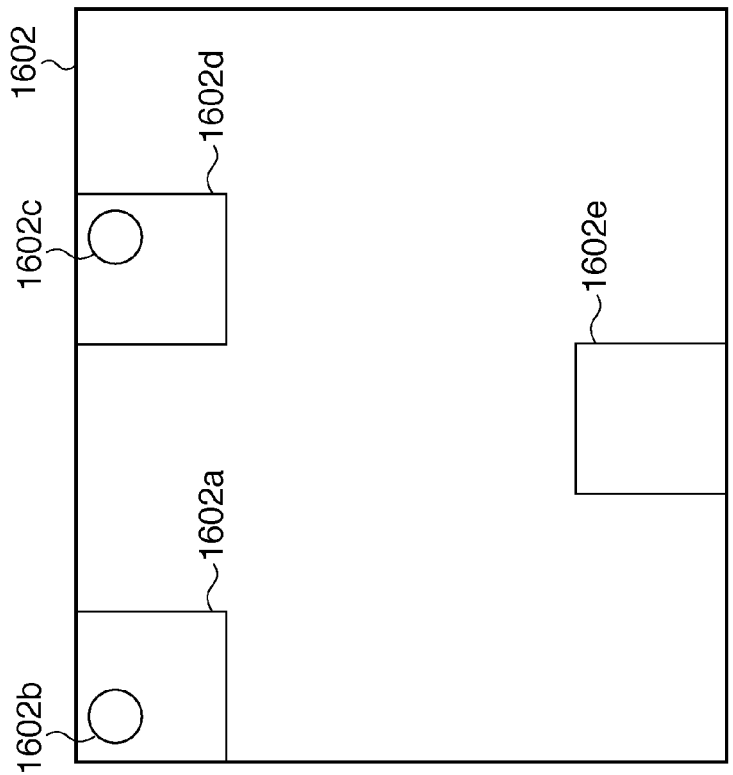
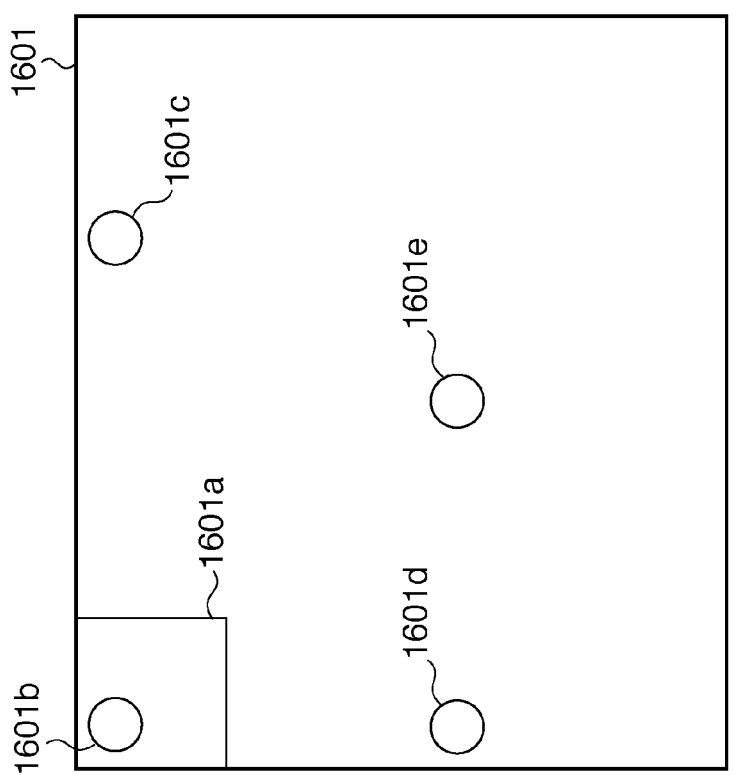

INFORMATION PROCESSING APPARATUS, VERIFICATION APPARATUS, AND METHODS OF CONTROLLING THE SAME

BACKGROUND OF THE INVENTION

1. Field of the Invention

The present invention relates to an information processing apparatus and a verification apparatus, which certify the integrity of image data, and methods of controlling the same.

2. Description of the Related Art

Image data sensed by a digital camera or the like may be altered using, for example, image-edit software. To accomplish this, a method as disclosed in reference: U.S. Pat. No. 5,499,294 is known. According to this reference, a digital camera holds secret information unique to it in advance, and performs signature processing for image data using the secret information inside the digital camera. After image sensing, verification can be done using the signature information.

Though the technique of the reference can verify whether an image is altered, it is impossible to specify the altered portion of the image.

SUMMARY OF THE INVENTION

The present invention has been made in consideration of the above-described problem, and provides a technique capable of specifying not only the presence/absence of alteration of an image but also the position of the alteration at a preset accuracy.

The present invention in its first aspect provides an information processing apparatus for generating, from image data, verification information to be used to certify the integrity of the image data, comprising: an image input unit which inputs the image data as an integrity-certification target; a block-division unit which divides the image data input by the image input unit into blocks each represented by a predetermined number of pixels; a block-coefficient-calculation unit which performs a calculation to obtain, for values of pixels included in each block, a block coefficient representing a feature of the block; a cell-division unit which divides each of the blocks divided by the block-division unit into cells, each having a size smaller than that of the block; a cell-coefficient-calculation unit which performs a calculation to obtain, for values of pixels included in each cell, a cell coefficient representing a feature of the cell; a first verification-data-generation unit which generates first verification data by selecting, from the block coefficients obtained by the block-coefficient-calculation unit, two block coefficients which form a block pair and generating data representing a magnitude relation of the two block coefficients which form the one block pair; a second verification-data-generation unit which generates second verification data by selecting the cell coefficients corresponding to two cells at preset positions so as to decide a cell pair and generating data representing a magnitude relation of the two cell coefficients which form the one cell pair; and an output unit which outputs the image data as the integrity-certification target input by the image input unit, and outputs the first verification data obtained by the first verification-data-generation unit and the second verification data obtained by the second verification-data-generation unit as the verification information for the image data as the integrity-certification target.

The present invention in its second aspect provides a verification apparatus for verifying the presence/absence of alteration of image data based on the image data and verification information for the image data, comprising: an input unit which inputs the image data as a verification target and the verification information for the image data; a block-division unit which divides the image data input by the input unit into blocks, each represented by a predetermined number of pixels; a block-coefficient-calculation unit which performs calculation to obtain, for values of pixels included in each block, a block coefficient representing a feature of the block; a cell-division unit which divides each of the blocks divided by the block-division unit into cells each having a size smaller than that of the block; a cell-coefficient-calculation unit which performs a calculation to obtain, for values of pixels included in each cell, a cell coefficient representing a feature of the cell; a first determination unit which, by selecting, from the block coefficients obtained by the block-coefficient-calculation unit, two block coefficients which form a block pair, generating data representing a magnitude relation of the two block coefficients which form the one block pair, and comparing the generated data with first verification data included in the verification information input by the input unit, determines the absence of an alteration if the comparison result indicates coincidence between the compared data, or the presence of an alteration if the comparison result indicates a lack of coincidence between the compared data; and a second determination unit which, if the first determination unit has determined the presence of an alteration, by selecting the cell coefficients corresponding to the two cells at the preset positions so as to decide a cell pair, generating data representing a magnitude relation of the two cell coefficients which form the one cell pair, and comparing the generated data generated by the second determination unit with second verification data included in the verification information input by the input unit, determines the absence of an alteration in the block that is a source of the cell pair of interest if the data comparison indicates coincidence between the compared data, or determines the block that is the source of the cell pair of interest as an alteration position if the comparison result indicates a lack of coincidence between the compared data.

The present invention in its third aspect provides a method of controlling an information processing apparatus for generating, from image data, verification information to be used to certify the integrity of the image data, comprising: an image input step of inputting the image data as an integrity certification target; a block-division step of dividing the image data input in the image input step into blocks, each represented by a predetermined number of pixels; a block-coefficient-calculation step of performing a calculation to obtain, for values of pixels included in each block, a block coefficient representing a feature of the block; a cell-division step of dividing each of the blocks divided in the block-division step into cells, each having a size smaller than that of the block; a cell-coefficient-calculation step of performing a calculation to obtain, for values of pixels included in each cell, a cell coefficient representing a feature of the cell; a first verification-data-generation step of generating first verification data by selecting, from the block coefficients obtained in the block-coefficient-calculation step, two block coefficients which form a block pair and generating data representing a magnitude relation of the two block coefficients which form the one block pair; a second verification-data-generation step of generating second verification data by selecting the cell coefficients corresponding to two cells at preset positions so as to decide a cell pair and generating data representing a magnitude relation of the two cell coefficients which form the one cell pair; and an output step of outputting the image data as the integrity-certification target input in the image input step, and outputting the first verification data obtained in the first verification-data-generation step and the second verification data obtained in the second verification-data-generation step as the verification information for the image data as the integrity-certification target.

The present invention in its fourth aspect provides a method of controlling a verification apparatus for verifying the presence/absence of alteration of image data based on the image data and verification information for the image data, comprising: an input step of inputting the image data as a verification target and the verification information for the image data; a block-division step of dividing the image data input in the input step into blocks each represented by a predetermined number of pixels; a block-coefficient-calculation step of performing a calculation to obtain, for values of pixels included in each block, a block coefficient representing a feature of the block; a cell-division step of dividing each of the blocks divided in the block-division step into cells, each having a size smaller than that of the block; a cell-coefficient-calculation step of performing a calculation to obtain, for values of pixels included in each cell, a cell coefficient representing a feature of the cell; a first determination step of, by selecting, from the block coefficients obtained in the block-coefficient-calculation step, two block coefficients which form a block pair, generating data representing a magnitude relation of the two block coefficients which form the one block pair, and comparing the generated data with first verification data included in the verification information input in the input step, determining the absence of an alteration if the comparison result indicates coincidence between the compared data, or determining the presence of an alteration if the comparison result indicates lack of coincidence between the compared data; and a second determination step of, if the presence of an alteration is determined in the first determination step, by selecting the cell coefficients corresponding to two cells at preset positions so as to decide a cell pair, generating data representing a magnitude relation of the two cell coefficients which form the one cell pair, and comparing the generated data with second verification data included in the verification information input in the input step, determining the absence of an alteration in the block that is a source of the cell pair of interest if the comparison result indicates coincidence between the compared data, or determining the block that is the source of the cell pair of interest as a position of the alteration if the comparison result indicates lack of coincidence between the compared data.

According to the present invention, it is possible to specify not only the presence/absence of alteration but also, if alteration is present, the position of alteration in each block.

Further features of the present invention will become apparent from the following description of exemplary embodiments (with reference to the attached drawings).

BRIEF DESCRIPTION OF THE DRAWINGS

FIGS. 16A and 16B are views showing examples of cell-pair selection according to the third modification of the first embodiment;

DESCRIPTION OF THE EMBODIMENTS

The embodiments of the present invention will now be described in detail with reference to the accompanying drawings.

First Embodiment

<Description of Overall System Configuration>

Figure 1:
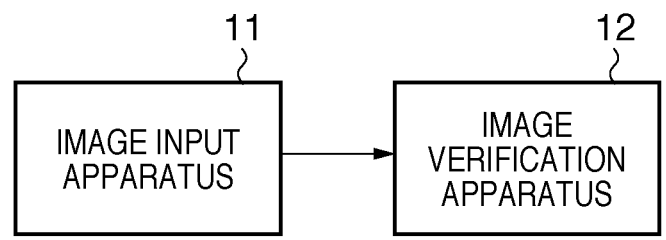
FIG. 1 is a block diagram for explaining the overall configuration of a system according to an embodiment.

FIG. 1 shows an example of the overall configuration of a system according to the embodiment. The system of the embodiment includes an image input apparatus 11 and an image-verification apparatus 12.

Referring to FIG. 1, the image input apparatus 11 generates image data and outputs the generated image data. Especially, the image input apparatus 11 according to the embodiment generates not only the image data but, also verification information capable of verifying whether the image data is altered, and outputs it together with the image data.

The image input apparatus 11 according to the embodiment causes an internal image sensing device, such as a CMOS or a CCD, to photoelectrically convert the optical image of an object, A/D-converts the resultant electrical signal of the image sensing image, and outputs the image data without image processing (outputs RAW image data).

The image-verification apparatus 12 verifies, based on verification information, whether the image data supplied from the image input apparatus 11 of the preceding stage is altered, and outputs the verification result.

The image input apparatus 11 and the image-verification apparatus 12 may be connected via a network, such as the Internet, so as to exchange various kinds of data. Alternatively, various kinds of data may be recorded in a storage medium such as a removable medium upon output so as to exchange them.

<Arrangement of Image Input Apparatus>

The functional arrangement of the image input apparatus 11 applied to this embodiment will be described below with reference to FIG. 4. The image input apparatus 11 corresponds to, for example, a digital camera which senses an image and adds a digital signature to the image data. Note that image input processing to be described here may be implemented by software processing executed by a control unit in cooperation with hardware, such as an image sensing device. In this case, the units should be considered as those regarded as the concepts of functions necessary for the processing.

Figure 4:
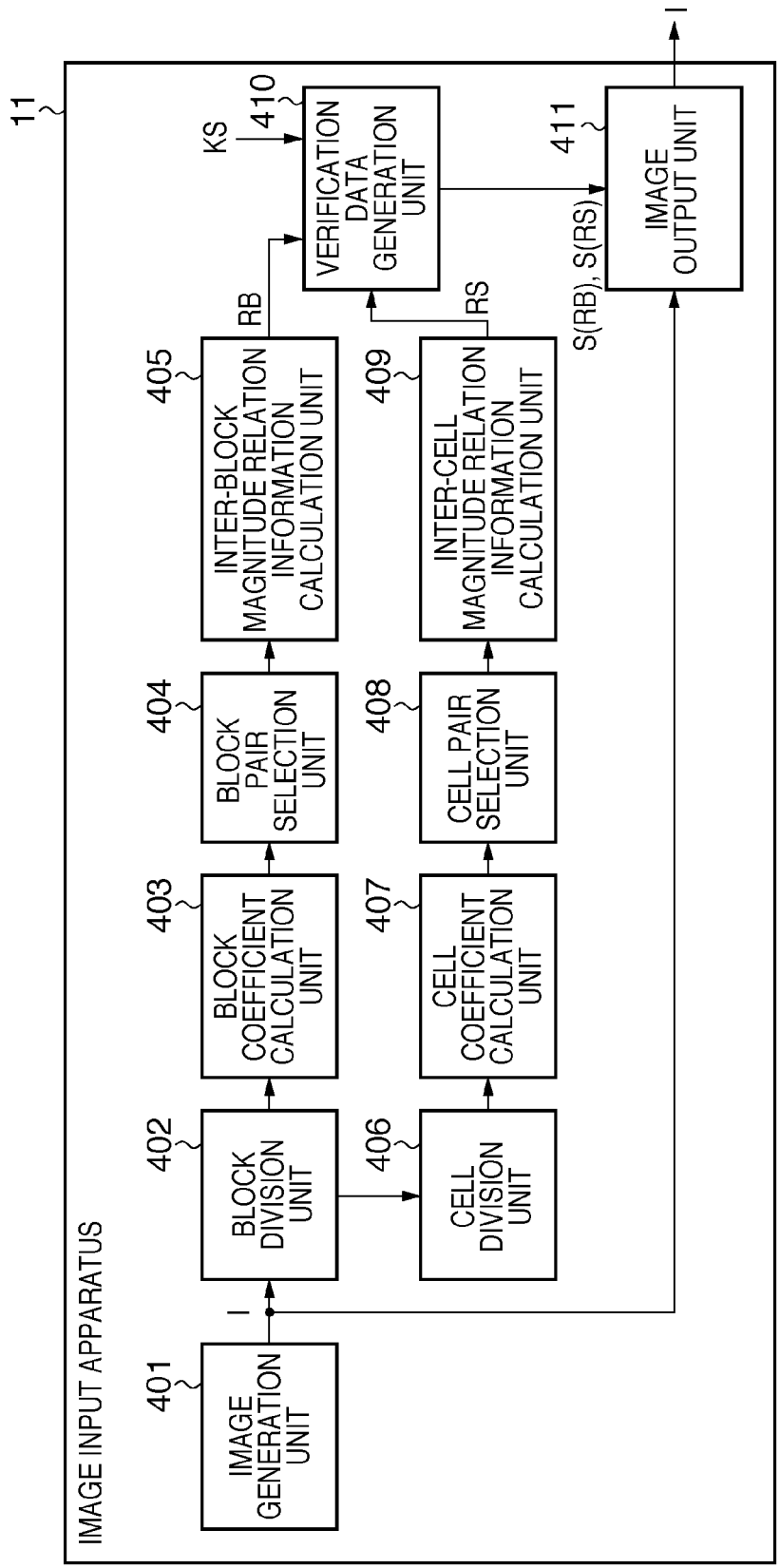
FIG. 4 is a block diagram showing the detailed arrangement of an image input apparatus according to the first embodiment.

The image input apparatus 11 shown in FIG. 4 has an arrangement for generating, from image data, first verification data and second verification data to be used to verify-integrity certification of the image. The first verification data is generated by a block-division unit 402, a block-coefficient-calculation unit 403, a block-pair selection unit 404, and an inter-block-magnitude-relation-information-calculation unit 405. The second verification data is generated by a cell-division unit 406, a cell-coefficient-calculation unit 407, a cell-pair-selection unit 408, and an inter-cell-magnitude-relation-information-calculation unit 409.

Referring to FIG. 4, an image generation unit 401 acquires a video signal generated by an optical system and an optical sensor as image information, thereby forming image data I. The image data I generated by the image generation unit 401 is supplied to the block-division unit 402 and an image output unit 411 of the succeeding stage. The block-division unit 402 receives the image data I generated by the image generation unit 401 of the preceding stage, divides the image into blocks, each including a plurality of pixels preset, and outputs the positions of the blocks and the pixel values in the blocks to the block-coefficient-calculation unit 403 and the cell-division unit 406 of the succeeding stage. Note that in this embodiment, a description will be provided assuming that each block has a size of 2×2 pixels.

The block-coefficient-calculation unit 403 calculates a block coefficient from block data of one block output from the block-division unit 402 of the preceding stage, and outputs the block coefficient to the block-pair-selection unit 404 of the succeeding stage. The block coefficient is, for example, the average of brightnesses of the pixels in the block. The average is obtained by an operation of dividing the sum of brightnesses of the pixels in the block by the number of pixels in the block. However, since the coefficient need only be a value (scalar value) determined depending on the pixel values included in the block, not only is the average of brightnesses applicable, but the median value or variance of brightnesses is also applicable. The block-pair-selection unit 404 selects pairs of blocks divided by the block-division unit 402, and outputs the block-pair-selection result to the inter-block-magnitude-relation-information-calculation unit 405.

A block pair is determined in, for example, the following way. First, random numbers are generated within the range from 0 to the number of horizontal pixels of the image and the range from 0 to the number of vertical pixels of the image. One block is determined using the generated random numbers as the coordinates (horizontal coordinate x and vertical coordinate y) of the upper left corner of the block. The other block is similarly determined using random numbers. The two blocks determined based on the random numbers in two steps are determined as a pair. In this way, the first and second blocks determined by random numbers are defined as one pair, the third and fourth blocks are defined as another pair, . . . . Note that a block-pair-selection unit 704 (to be described later) of the image-verification apparatus 12 also uses the same random number algorithm and shares the initial set value (seed value) of random number generation. To share the initial set value, the image output unit 411 adds the initial set value of the random number together with verification data (to be described later) when outputting the image data I. The image-verification apparatus 12 uses the added initial set value of the random number upon receiving the image data I.

Note that the two blocks that form a block pair are preferably apart from each other by a predetermined distance (for example, two pixels) or more. This makes it difficult for the alterer to specify the block pair, and raises the alteration detection accuracy. To attain this, when the coordinates (horizontal coordinate x0 and vertical coordinate y0) of the upper left corner of one block are obtained by the above-described method using random numbers, the horizontal coordinate x of the upper left corner of the other block is obtained by, using a preset distance value TH, generating a random number within the range from 0 to (x0−TH) or from (x0+TH) to the image size (horizontal size). The vertical coordinate y is also obtained by generating a random number within the range from 0 to (y0−TH) or from (y0+TH) to the image size (vertical size). It is desirable that TH is a natual number, 0<x0−TH, x0+TH< the image size (horizontal size), 0<y0−TH and y0+TH< the image size (vertical size). Note that the blocks once selected may be excluded from the pair candidates next time.

The inter-block-magnitude-relation-information-calculation unit 405 calculates inter-block-magnitude-relation information RB from each block pair selected by the block-pair-selection unit 404, and outputs the information to a verification-data-generation unit 410 of the succeeding stage.

Using, for example, the block coefficient (to be referred to as a first block coefficient) of the first block included in the block pair and the block coefficient (to be referred to as a second block coefficient) of the second block, the inter-block-magnitude-relation information RB is obtained by when first block coefficient$\leqq$second block coefficient, RB=0, and when first block coefficient<second block coefficient, RB=1 (1)

However, any other information representing the magnitude relation is usable.

The cell-division unit 406 further divides one block output from the block-division unit 402 of the preceding stage into a plurality of cells, and outputs the cell-division result representing the positions of the cells and the pixel values to the cell-coefficient-calculation unit 407 of the succeeding stage.

For example, in this embodiment, since one block includes 2×2 pixels, one cell includes 1×1 pixel. When one block has a size of 4×4 pixels, one cell may include several, that is, 2×2 pixels, as a matter of course. In any case, the cell size is set to be smaller than the block size.

The cell-coefficient-calculation unit 407 calculates the coefficient of each cell based on the cell-division result of the block of interest output from the cell-division unit 406, and outputs the cell coefficients to the cell-pair-selection unit 408 of the succeeding stage.

The cell coefficient is, for example, the average of brightnesses of the pixels in the cell, like the block coefficient described with regard to the block-coefficient-calculation unit 403. The median value or variance of brightnesses is also applicable. The cell-pair-selection unit 408 selects pairs of cells-divided by the cell division unit 406, and outputs the cell-pair-selection result to the inter-cell-magnitude-relation-information-calculation unit 409.

A cell-pair determination is done for each block of the block pair selected by the block-pair-selection unit 404. The inter-cell-magnitude-relation-information-calculation unit 409 calculates the inter-cell-magnitude-relation information RS from each cell pair selected by the cell-pair-selection unit 408, and outputs it to the verification-data-generation unit 410 of the succeeding stage.

Like the inter-block-magnitude-relation-information-calculation unit 405, the inter-cell-magnitude-relation-information-calculation unit obtains the inter-cell-magnitude-relation-information RS, using, for example, the cell coefficient (to be referred to as a first cell coefficient) of the first cell of the cell pair and the cell coefficient (to be referred to as a second cell coefficient) of the second cell, by when first cell coefficient≧second cell coefficient,
    RS=0, and when first cell coefficient<second cell coefficient,
    RS=1    (2)

The verification-data-generation unit 410 causes an encryption unit in it to generate verification data S(RB) and S(RS) based on the received inter-block magnitude relation information RB calculated by the inter-block-magnitude-relation information calculation unit 405 and the inter-cell-magnitude-relation information RS calculated by the inter-cell-magnitude-relation-information-calculation unit 409, and outputs the verification data to the image output unit 411 of the succeeding stage.

As the verification data of this embodiment, a MAC (Message Authentication Code) or an electronic signature is applicable. Note that the method of generating the MAC or electronic signature is known to those skilled in the art, and a detailed description thereof will be omitted. Data as the target of the electronic signature or MAC is formed from, for example, a header and the inter-block-magnitude-relation information RB, as indicated by reference numeral 1001 in FIG. 10A, or a header and the inter-cell-magnitude-relation information RS, as indicated by reference numeral 1002 in FIG. 10B. The reference numeral 1001 in FIG. 10A indicates the structure of the verification data S(RB), and the reference numeral 1002 in FIG. 10B indicates the structure of the verification data S(RS). The pieces of magnitude-relation information RB and RS are arranged in the order of a selected random number. For example, the pieces of information RB are arranged in the order of RB of the first block pair, RB of the second block pair, . . . . On the other hand, the pieces of information RS are arranged in the order of RS of the cell pair (first cell pair) in one block of the first block pair, RS of the cell pair (second cell pair) in the other block of the first block pair, RS of the cell pair (third cell pair) in one block of the second block pair, RS of the cell pair (fourth cell pair) in the other block of the second block pair, . . . .

Figure 10A:
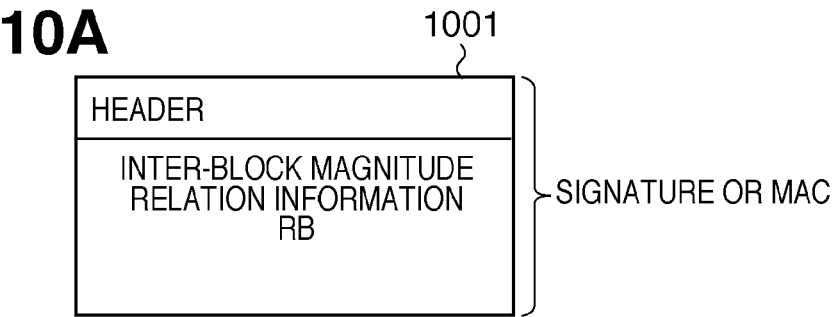
FIGS. 10A to 10C are views showing examples of verification data according to the first and second embodiments.

The header of the data structure indicated by reference numeral 1001 in FIG. 10A includes information of the total number of pieces of inter-block-magnitude-relation information RB. The header of the data structure indicated by reference numeral 1002 also includes information of the total number of pieces of inter-block-magnitude relation information RB and information of the number of cell pairs in the block pairs. To acquire a plurality of pieces of inter-cell-magnitude-relation information RS in the selected Xth block pair, pieces of information RS, which number as many as the cell pairs in each block pair are acquired by skipping cell pairs in (X-1) block pairs from the top of the inter-cell-magnitude-relation information RS indicated by reference numeral 1002. In this way, only a plurality of pieces of information RS in a specific block pair can directly be acquired using the header. Hence, the image-verification apparatus 12 to be described later can determine the presence/absence of alteration in a necessary number of block pairs. The verification data is generated in the above-described way.

Additionally, the electronic signature or MAC is applied after reducing the information amount by using a hash or the like. Note that although the information amount is reduced in this embodiment, the present invention is not limited to this, and the electronic signature or MAC may be applied to, for example, raw data.

Note that when a MAC is applied as verification data, secret information to be used to generate the MAC is input as a signature key KS and used for MAC generation. Since the signature key KS needs to be shared by the image input apparatus and the verification apparatus to be described later, common secret information is held in the image input apparatus and the verification apparatus in advance. On the other hand, when an electronic signature is applied as verification data, a secret key to be used to generate the electronic signature is input as the signature key KS. The image input apparatus holds the signature key KS in advance, and the verification data generation unit 410 uses the signature key KS as needed. A public key corresponding to the signature key KS used by the verification data generation unit 410 is held in the verification apparatus to be described later.

The image output unit 411 records the image data I and the verification data in a storage medium such as a removable medium as one file, or sends the data to a predetermined host via a wired/wireless network. However, the image data I and the verification data may be output to separate files. The arrangement of the image input apparatus 11 according to the embodiment has been described above.

<Procedure of Image-Sensing Processing>

Figure 5:
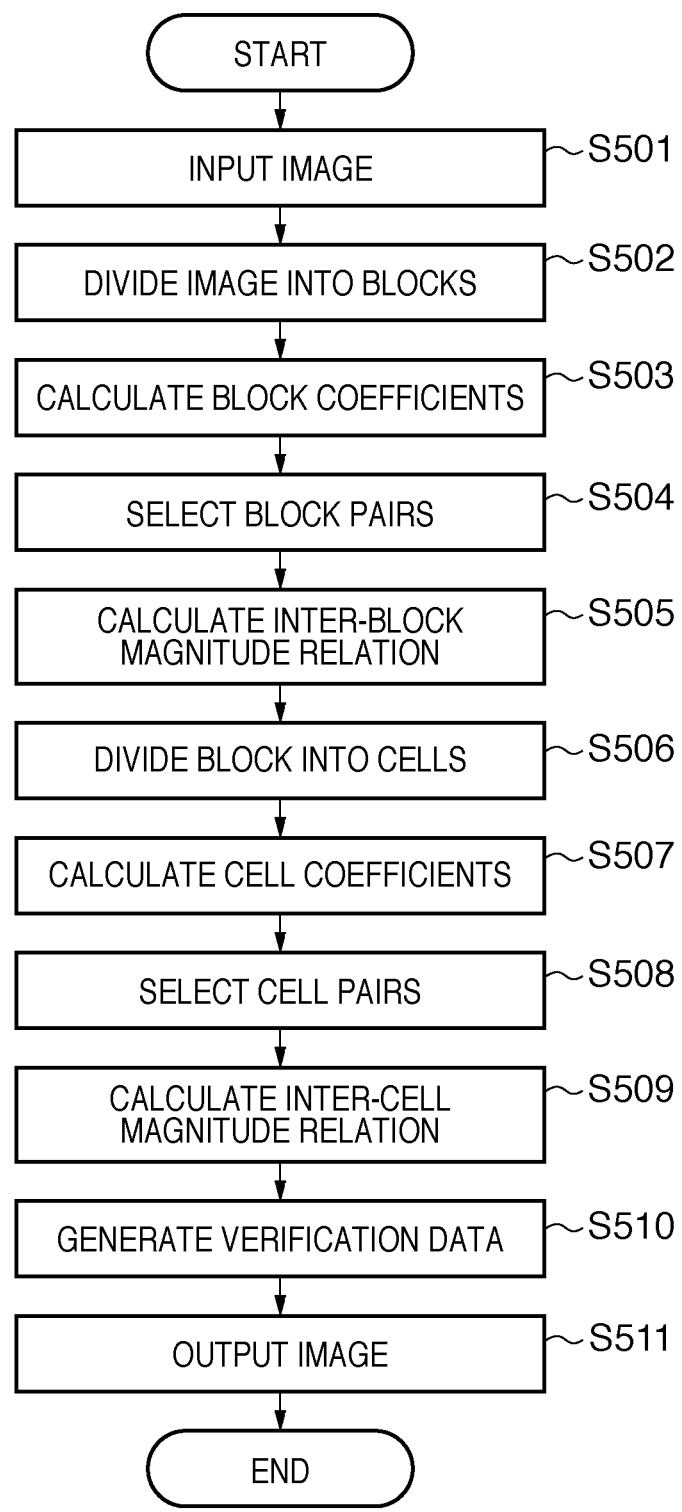
FIG. 5 is a flowchart illustrating the procedure of image-sensing processing according to the first embodiment.
Figure 6:
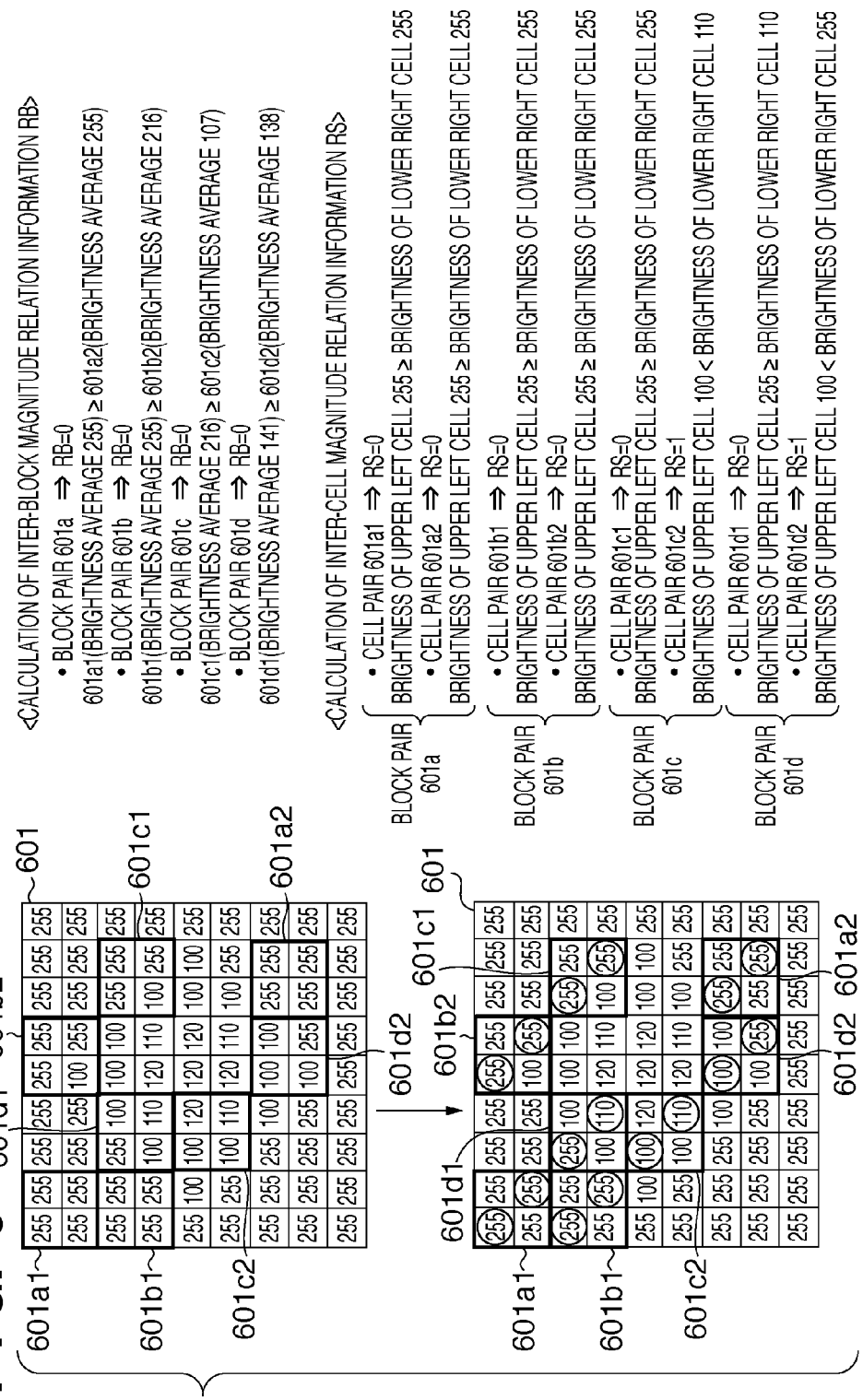
FIG. 6 is a view showing a calculation example of inter-block and inter-cell magnitude-relation information according to the embodiment.

The procedure of image-sensing processing to be executed by the image input apparatus 11 of the embodiment will be explained below with reference to FIGS. 5 and 6. FIG. 5 is a flowchart illustrating the procedure of image-sensing processing applicable to the embodiment. FIG. 6 shows a detailed example of calculation of the inter-block magnitude-relation information RB and inter-cell-magnitude-relation information RS. The operation of the image input apparatus shown in FIG. 4 is controlled based on the procedure shown in FIG. 5. The midway operation may partially be executed as software processing.

In step S501, the image generation unit 401 senses the image data I. For example, the image data I of 9×9 pixels as denoted by reference numeral 601 in FIG. 6 is obtained. Note that the numerical value of each pixel of the image data I represents brightness. In step S502, the block-division unit 402 divides the image data I into blocks. For example, the image data I is divided into blocks each having 2×2 pixels as indicated by 601$a$1 in FIG. 6. In step S503, the block-coefficient-calculation unit 403 calculates block-coefficients using the blocks divided in step S502. For example, in FIG. 6, the average of brightnesses is used as a block coefficient. The coefficient of the block 601$a$1 is the average "255" of brightnesses in it. In step S504, the block-pair-selection unit 404 selects block pairs from the blocks divided in step S502. For example, the following four block pairs are selected from the image data 601 in FIG. 6.

601*a*1 and 601*a*2 (block pair 601*a*)
601*b*1 and 601*b*2 (block pair 601*b*)
601*c*1 and 601*c*2 (block pair 601*c*)
601*d*1 and 601*d*2 (block pair 601*d*)

In step S505, the inter-block-magnitude-relation-information-calculation unit 405 calculates the inter-block-magnitude-relation information RB using the block pairs selected in step S504 and the coefficients of the blocks. For example, the pieces of inter-block-magnitude-relation information RB of the four block pairs 601*a* to 601*d* in FIG. 6 are calculated using expressions (1) as RB(601*a*)=0
RB(601*b*)=0
RB(601*c*)=0
RB(601*d*)=0 where RB(X) represents the magnitude relation of a block pair X calculated by expressions (1).

In step S506, the cell-division unit 406 further divides each block divided by the block-division-unit 402 into cells. For example, in the image data I 601 shown in FIG. 6, one cell includes 1×1 pixel. In step S507, the cell-coefficient-calculation unit 407 calculates cell coefficients using the cells divided in step S506. For example, in FIG. 6, brightness is used as a cell coefficient. The coefficient of the upper left cell (pixel) of the image denoted by reference numeral 601 is brightness "255".

In step S508, the cell-pair-selection unit 408 selects, as a cell pair, the upper left cell and the lower right cell in each block of the block pairs. More specifically, in the image denoted by reference numeral 601 shown in FIG. 6, the upper left cell and the lower right cell of each block, which are marked by circles, are selected as a cell pair. The cell pairs of the block pair 601*a* are the cell pairs 601*a*1 and 601*a*2. The cell pairs of the block pair 601*b* are the cell pairs 601*b*1 and 601*b*2. The cell pairs of the block pair 601*c* are the cell pairs 601*c*1 and 601*c*2. The cell pairs of the block pair 601*d* are the cell pairs 601*d*1 and 601*d*2.

In step S509, the inter-cell-magnitude-relation-information-calculation unit 409 calculates the inter-cell-magnitude-relation information RS using the cell coefficients of the cell pairs selected in step S508. For example, the pieces of inter-cell-magnitude-relation information RS of the eight cell pairs 601*a*1 to 601*d*2 in FIG. 6 are calculated using expressions (2) as RS(601*a*1)=0
RS(601*a*2)=0
RS(601*b*1)=0
RS(601*b*2)=0
RS(601*c*1)=0
RS(601*c*2)=1
RS(601*d*1)=0
RS(601*d*2)=1 where RS(X) represents the magnitude relation of a cell pair X calculated by expressions (2).

In step S510, the verification data generation unit 410 generates the verification data S(RB) AND S(RS) using the inter-block-magnitude-relation information RB and the inter-cell-magnitude-relation information RS. Finally, in step S511, the image output unit 411 outputs image data with the verification data S(RB) AND S(RS) added. The procedure of image-sensing-processing according to the embodiment has been described above.

Note that in this embodiment, an example has been described in which eight blocks are selected in image data of 9×9 pixels, as shown in FIG. 6. However, all blocks defined in the image data may be rearranged at random so as to form a pair by two blocks. At this time, if the number of horizontal and vertical pixels corresponding to the image size is not an integer multiple of the block size, the pixels in shortage are assumed to have preset values. In this embodiment, since the block size is 2×2 pixels, the total number of blocks is (total number of pixels/4), and the number of block pairs is 1/2, that is, (total number of pixels/8). That is, the number of bits necessary for the inter-block-magnitude-relation information RB is represented by (total number of pixels/8). Recent digital cameras normally need more than 10,000,000 image sensing pixels. For this reason, the number of block pairs is considerably large, and the number of bits necessary for the inter-block-magnitude-relation information RB is also enormous. This also applies to the inter-cell-magnitude-relation information RS. In this case, blocks in number represented by a preset ratio of the total number of pixels may be selected in accordance with random numbers. If the ratio is 1/64, one block (2×2 pixels) is determined in a region of 8×8 pixels on average. In other words, the average distance between selected blocks corresponds to eight pixels. This can supposedly sufficiently specify the position of alteration intended by man. The ratio may be selected, in accordance with user's desired accuracy, from several ratios prepared in advance. In this case, however, information about the selected accuracy is also stored together with the verification data. For the cell pairs as well, all cells in blocks may be rearranged at random so as to form a pair by two cells, like the above-described block pairs.

<Arrangement of Image-Verification Apparatus>

The functional arrangement of the image-verification apparatus 12 applied to this embodiment will be described below with reference to FIG. 7.

Note that image verification processing to be described here may be implemented by software processing to be executed by an information processing apparatus represented by a personal computer or the like and its processor. In this case, the units should be considered as those regarded as the concepts of functions necessary for the processing.

Figure 7:
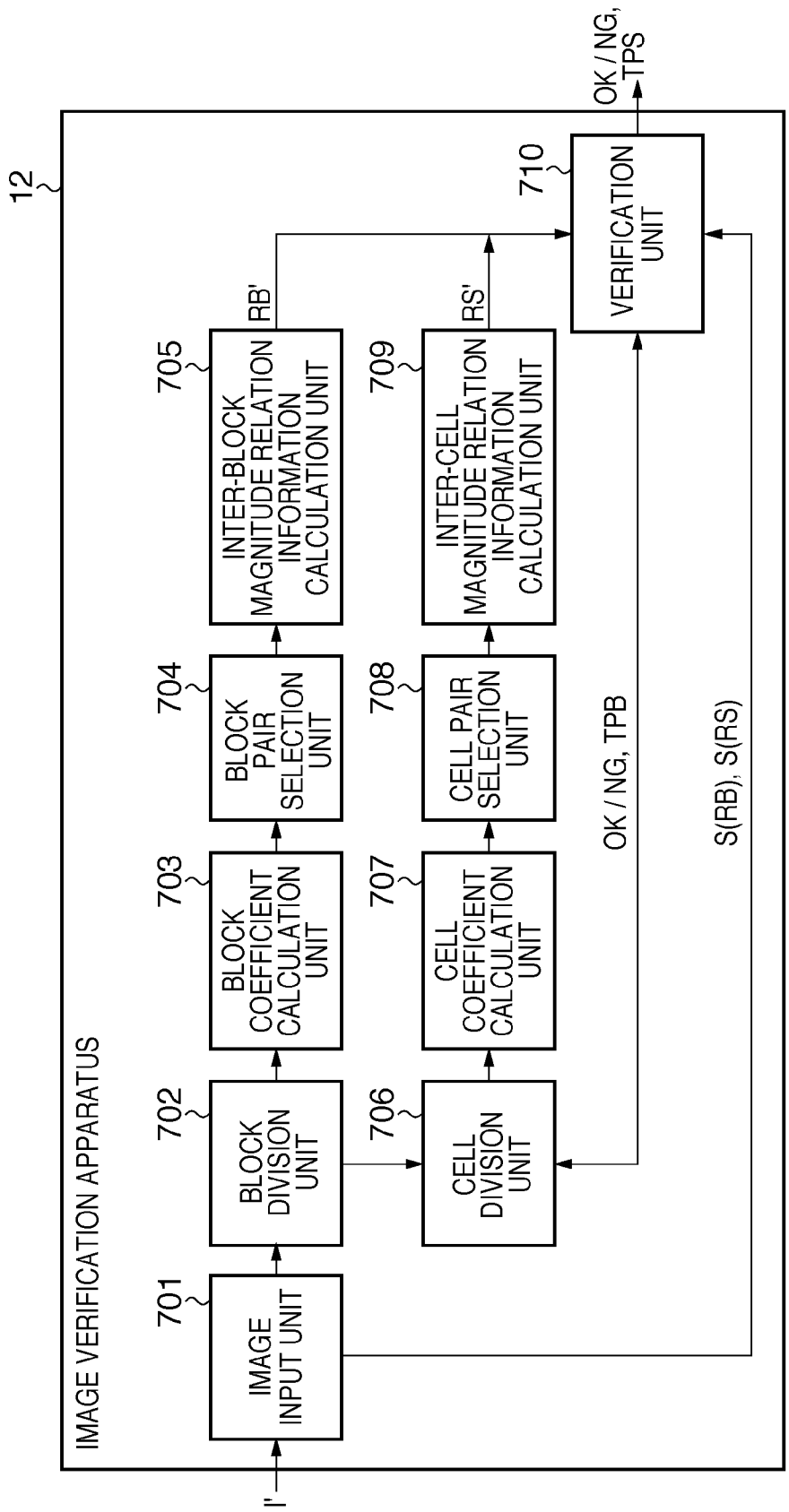
FIG. 7 is a block diagram showing the detailed arrangement of an image-verification apparatus according to the first embodiment.

Referring to FIG. 7, an image input unit 701 inputs image data I' to be verified. Consider that the image data I' is input via a removable medium and/or a network or the like is helpful for easier understanding. The image input unit 701 also analyzes the header of the input image data I', extracts the added verification data S(RB) and S(RS), outputs the extracted verification data S(RB) and S(RS) to a verification unit 710, and outputs the image data I' to a block-division unit 702. Note that the image input unit 701 analyzes the image data I', extracts the initial set value (seed value), and supplies it to the block-pair-selection unit 704. As a result, the block-pair-selection unit 704 selects the same block pairs as those selected by the block-pair-selection unit 404 though at random.

The block-division unit 702 performs the same processing as that of the block-division unit 402 in FIG. 4 to as to divide the image data I' received from the image input unit 701 of the preceding stage into blocks. From then on, a block-coefficient-calculation unit 703, the block-pair-selection unit 704, and the inter-block-magnitude-relation-information-calculation unit 705 perform the same processes as those of the block-coefficient-calculation unit 403, block-pair-selection unit 404, and the inter-block-magnitude-relation-information-calculation unit 405 in FIG. 4, respectively, and a description thereof will not be repeated. A cell-division unit 706, a cell-coefficient-calculation-unit 707, a cell-pair-selection unit 708, and an inter-cell-magnitude-relation-information-calculation unit 709 also perform the same processes as those of the units with the same names in FIG. 4.

The verification unit 710 receives inter-block-magnitude-relation information RB' calculated by the inter-block-magnitude-relation-information-calculation unit 705 of the preceding stage, the inter-cell-magnitude-relation information RS' calculated by the inter-cell-magnitude-relation-information calculation unit 709, the verification data S(RB) and S(RS) extracted by the image input unit 701, and the verification key KS. Using the received data, the verification unit 710 verifies whether the image data file I' (image data portion) is altered, and outputs the verification result (OK/NG), the altered block pair TPB, and the alteration position TPS. The altered block pair TPB is represented by, for example, the coordinates of the upper left corner of a block which is close to the upper left corner of the image in a block pair. The alteration position TPS is represented by, for example, the coordinates of the pixel of the upper left corner in a block including a cell pair.

In the above-described way, the two-dimensional space of the image is displayed. The coordinate position of the cell of the upper left corner in each block of the block pairs is highlighted as compared to the remaining coordinate positions. This allows, as an alteration position, a portion to be specified where the highlighted portions are densely arranged.

Figure 11:
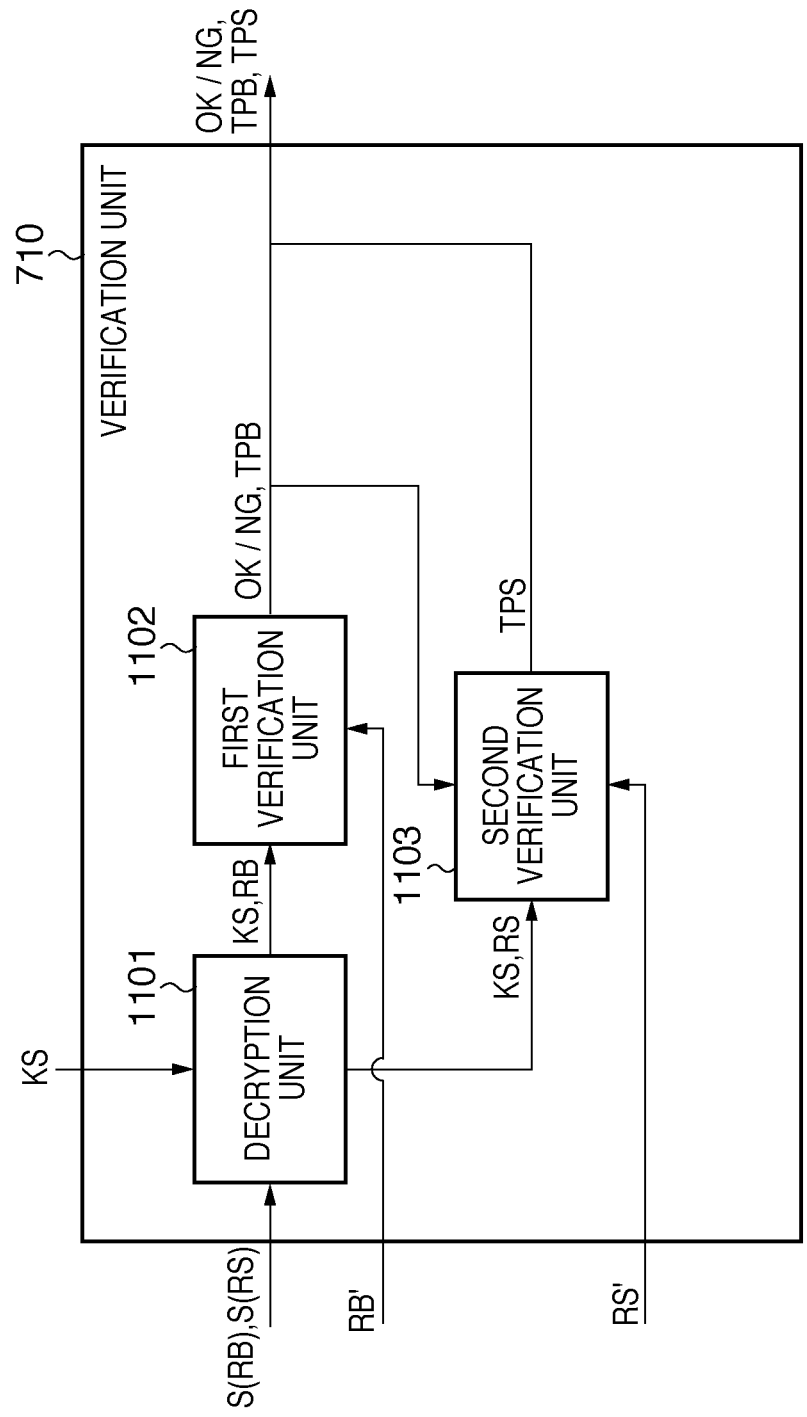
FIG. 11 is a block diagram showing the arrangement of a verification unit according to the first embodiment.

The verification unit 710 according to the embodiment will be described here in detail with reference to FIG. 11. As shown in FIG. 11, the verification unit 710 of the embodiment includes a decryption unit 1101, a first verification unit 1102, and a second verification unit 1103.

Only when the verification data are electronic signatures, the decryption unit 1101 decrypts the verification data S(RB) and S(RS) using the similarly input verification key KS. Only the verification data S(RB) may be decrypted first, and decryption of the verification data S(RS) may be done when the verification result of the first verification unit 1102 to be described later is NG. The obtained inter-block-magnitude-relation information RB and inter-cell-magnitude-relation information RS (whose information amounts are reduced using a hash or the like) are output to the first verification unit 1102 and the second verification unit 1103, respectively. Since the verification unit 710 needs to correspond to the verification-data-generation unit 410, the verification key KS should be considered as a public key corresponding to the signature key KS applied by the verification-data-generation unit 410. If decryption has failed, NG is output.

When the verification data are MACs, the decryption unit 1101 does not execute processing at all, and regards the verification data S(RB) and S(RS) as RB and RS, respectively. RB is output to the first verification unit 1102 together with the verification key KS. RS is output to the second verification unit 1103 together with the verification key KS. The first verification unit 1102 and the second verification unit 1103 to be described later generate the MACs of the inter-block-magnitude-relation information RB' and the inter-cell-magnitude-relation information RS' using the verification key KS. The generated MACs are compared with RB and RS. Since the verification unit 710 corresponds to the verification-data-generation unit 410, the verification key KS applies the same secret information as that of the signature key applied by the verification-data-generation unit 410.

The first verification unit 1102 receives the inter-block-magnitude-relation information RB obtained by the decryption unit 1101 of the preceding stage and the inter-block-magnitude-relation information RB' calculated by the inter-block-magnitude-relation-information calculation unit 705 of the preceding stage. The first verification unit 1102 determines the presence/absence of alteration of the image data I' based on whether RB equals RB' in all block pairs. The first verification unit 1102 outputs the verification result (OK/NG). More specifically, the possibility of determination errors is taken into consideration, though NG may be output if RB and RB' are not equal in at least one of two pairs at the same bit position. If RB equals RB' in all block pairs, the verification result (OK) representing the absence of alteration is output. On the other hand, if RB does not equal RB' in at least one block pair, the number of block pairs in which RB equals RB' is counted. If the number is equal to or more than a threshold TH1 (a value determined by the image size and a preset ratio), the verification result (OK) representing the absence of alteration is output. Conversely, if the number is less than the threshold TH1, the verification result (NG) representing the presence of alteration and the altered block pair TPB representing the position of the block pair are output. Note that when the verification data is generated as a MAC, the first verification unit 1102 also receives the verification key KS from the decryption unit 1101 of the preceding stage. The first verification unit 1102 generates the MAC of the inter-block-magnitude-relation information RB' using the verification key KS, and determines whether it coincides with the inter-block-magnitude-relation information RB already generated as a MAC.

The inter-cell-magnitude-relation information RS' is obtained via the cell-division unit 706, the cell-coefficient-calculation unit 707, the cell-pair-selection unit 708, and the inter-cell-magnitude-relation-information-calculation unit 709, and the second verification unit 1103 of the succeeding stage verifies the alteration position. The second verification unit 1103 receives the inter-cell-magnitude-relation information RS obtained by the decryption unit 1101 of the preceding stage and the inter-cell-magnitude-relation information RS' calculated by the inter-cell-magnitude-relation-information-calculation unit 709 of the preceding stage. The second verification unit 1103 verifies the alteration position of the image data I' based on whether RS equals RS', and performs an output operation corresponding to the result.

If RS equals RS', the second verification unit 1103 determines that it is not an alteration position, and outputs nothing (or outputs information representing a non-alteration position). Conversely, if RS does not equal RS', the second verification unit 1103 outputs the alteration position TPS indicating that the block including the cell pair of interest is the alteration position. Note that when the verification data is generated as a MAC, the second verification unit 1103 also receives the verification key KS from the decryption unit 1101 of the preceding stage. The second verification unit 1103 generates the MAC of the inter-cell-magnitude-relation information RS' using the verification key KS, and determines whether it coincides with the inter-cell-magnitude-relation information RS already generated as a MAC.

<Procedure of Image Verification Processing>

Figure 8:
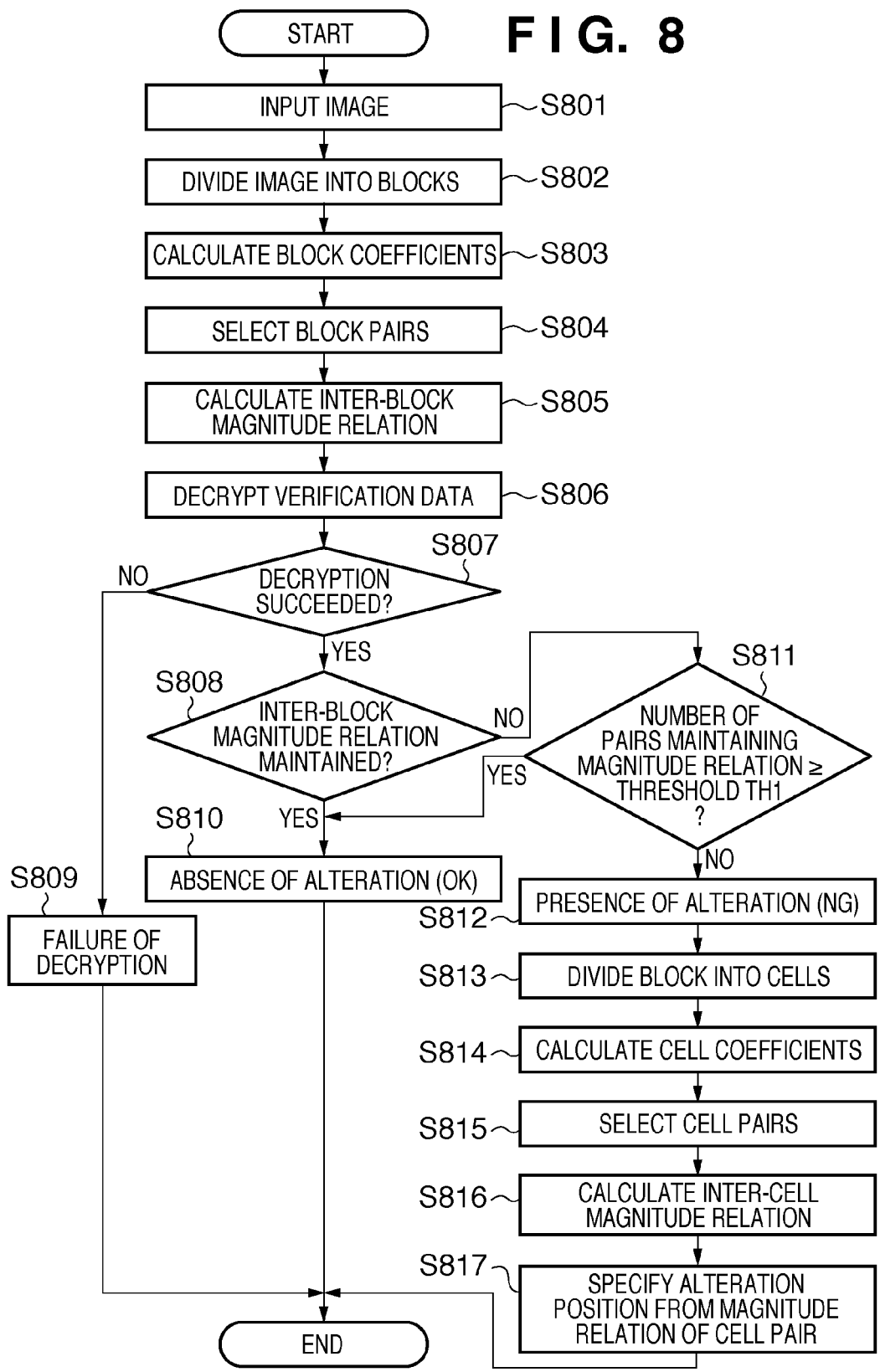
FIG. 8 is a flowchart illustrating the procedure of image-verification processing according to the first embodiment.
Figure 9:
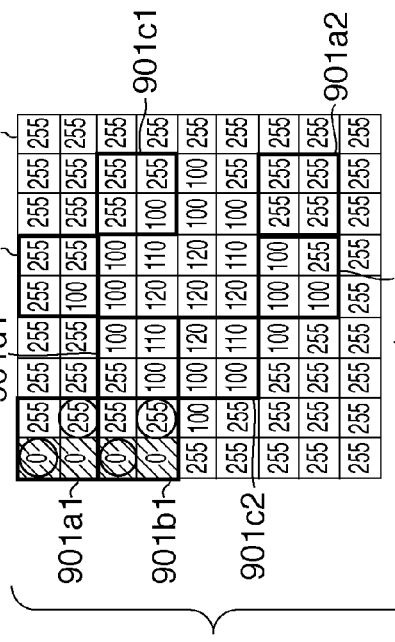
FIG. 9 is a view showing an example of image-verification processing according to the first embodiment.

The procedure of image verification processing to be executed by the image-verification apparatus 12 of the embodiment will be explained below with reference to FIGS. 8 and 9. FIG. 8 is a flowchart illustrating the procedure of image verification processing applicable to the embodiment. FIG. 9 shows a detailed example of an alteration presence/absence determination and the alteration-position specifying of the embodiment. In FIG. 9, with reference numeral 901 denoting an image obtained by altering the image 601 in FIG. 6. Hatched pixels represent altered portions. Note that in FIG. 9, verification data are generated using an electronic signature. The operation of the image-verification apparatus shown in FIG. 7 is controlled based on the procedure shown in FIG. 8. The midway operation may partially be executed as software processing.

In step S801, the image input unit 701 inputs the image data I'. For example, the image data I' of 9×9 pixels, as indicated by reference numeral 901 in FIG. 9, is input. Note that the numerical value of each pixel of the image shown in FIG. 9 represents brightness. In step S802, the block-division unit 702 divides the image data I' into blocks. For example, the image data I' is divided into blocks each having 2×2 pixels as indicated by reference numeral 901a1 in FIG. 9, as in FIG. 6. In step S803, the block-coefficient-calculation unit 703 calculates block coefficients using the blocks divided in step S802. For example, in FIG. 9, the coefficient is obtained as in FIG. 6, and the average of brightnesses in the block indicated by reference numeral 901a1 is "127". In step S804, the block-pair-selection unit 704 selects block pairs from the blocks divided in step S802. For example, the following four block pairs are selected from the image represented by reference numeral 901 in FIG. 9 in the same way as in FIG. 6. Note that although an example in which the number of block pairs is four will be explained here, the number of block pairs can be determined as in the image input apparatus (for example, the determination is done based on the image size).

901a1 and 901a2 (block pair 901a)
901b1 and 901b2 (block pair 901b)
901c1 and 901c2 (block pair 901c)
901d1 and 901d2 (block pair 901d)

In step S805, the inter-block-magnitude-relation-information-calculation unit 705 calculates the inter-block-magnitude-relation information RB' using the block pairs selected in step S804 and the coefficients of the blocks. For example, the pieces of inter-block-magnitude-relation information RB' of the four block pairs 901a to 901d in FIG. 9 are calculated (as four bits) using expressions (1) as RB'(901a)=1
RB'(901b)=1
RB'(901c)=0
RB'(901d)=0

In step S806, the decryption unit 1101 in FIG. 11 executes decryption processing. In step S807, it is determined whether decryption has succeeded. If the decryption processing has succeeded, it is determined whether the magnitude relation between the block pairs is maintained (step S808). Otherwise, the verification is determined to have failed (step S809). Note that if the verification data is generated as a MAC, the processes in steps S806, S807, and S809 are not performed. Hence, after step S805, the process advances to step S808.

In step S808, the first verification unit 1102 determines whether the magnitude relation between the block pairs is maintained. That is, the first verification unit 1102 determines whether RB coincides with RB' (first determination processing based on verification information). More specifically, the first verification unit 1102 compares the bits of RB and RB' with each other. If the bits coincide, the absence of alteration (OK) is output (step S810), and the processing ends. On the other hand, if the bits do not coincide, the process advances to step S811. Note that when the verification data is generated as a MAC, the first verification unit 1102 receives the verification key KS from the decryption unit 1101. The first verification unit 1102 generates the MAC of the inter-block-magnitude-relation information RB' using the verification key KS, and determines whether it coincides with the inter-block-magnitude-relation information RB already generated as a MAC.

In step S811, the first verification unit 1102 determines whether the number of block pairs maintaining the magnitude relation is equal to or more than the threshold TH1. If the number is equal to or more than the threshold TH1 (YES), data indicating the absence of alteration (OK) is output (step S810), and the processing ends. On the other hand, if the number is less than the threshold (NO), data indicating the presence of alteration (NG) is output (step S812), and the process advances to step S813. For example, in FIG. 9, RB equals RB' in the two block pairs 901c and 901d while RB does not equal RB' in the block pairs 901a and 901b. Assume that the threshold TH1 is 3. The number of block pairs maintaining the magnitude relation is two, which is less than the threshold TH1. Hence, the block pairs 901a and 901b are the altered block pairs TPB, and the presence of an alteration (NG) is determined. Note that the determination processing in step S811 may be avoided to raise the strictness of alteration. In this case, if NO in step S808, the process advances to step S812.

In step S813, the cell-division unit 706 further divides each block divided by the block-division unit 702 into cells. For example, in the image denoted by reference numeral 901 shown in FIG. 9, one cell includes a 1×1 pixel, as in FIG. 6.

In step S814, the cell-coefficient-calculation unit 707 calculates cell coefficients using the cells divided in step S806. However, processing of the following steps is executed for only the altered block pairs TPB determined to have possibly been altered. For example, in FIG. 9, the coefficient is obtained as in FIG. 6, and the upper left cell (pixel) of the image denoted by reference numeral 901 has brightness "0" as a coefficient.

In step S815, the cell-pair-selection unit 708 selects cell pairs from the cells divided in step S806. For example, in FIG. 9, the upper left pixel and the lower right pixel of each block, which are marked by circles, are selected in the image denoted by reference numeral 901 as a cell pair as in FIG. 6. Cell pairs are selected from the block pairs 901a and 901b determined as altered block pairs. The cell pairs of the block pair 901a are the cell pairs 901a1 and 901a2. The cell pairs of the block pair 901b are the cell pairs 901b1 and 901b2.

In step S816, the inter-cell-magnitude-relation-information-calculation unit 709 calculates the inter-cell-magnitude-relation information RS' using the cell pairs selected in step S808 and the coefficients of the blocks of the cell pairs. For example, the pieces of inter-cell-magnitude-relation information of the four cell pairs 901a1, 901a2, 901b1, and 901b2 in FIG. 9 are calculated using expressions (2) as RS'(901a1)=1, RS'(901a2)=0, RS'(901b1)=1, and RS'(901b2)=0.

In step S817, the second verification unit 1103 specifies the alteration positions TPS based on the magnitude relation between the cell pairs (a second determination processing based on verification information). More specifically, the second verification unit 1103 determines whether RS' equals RS. If RS' equals RS, the cell pair is not determined as the alteration position TPS. On the other hand, if RS' does not equal RS, the cell pair is determined as the alteration position TPS, and the position of the cell pair of interest is output. In FIG. 9, the cell pairs 901a1 and 901b1 are determined as the alteration positions TPS, and output as (0,0) and (0,2). In this case, x of (x,y) is the horizontal coordinate, and y is the vertical coordinate. When the verification data is generated as a MAC, the second verification unit 1103 receives the verification key KS from the decryption unit 1101. The second verification unit 1103 generates the MAC of the inter-cell-magnitude-relation information RS' using the verification key KS, and determines whether it coincides with the inter-cell-magnitude-relation information RS already generated as a MAC.

Note that the alteration positions TPS are used for processing of displaying the image data I' with red marks added to the corresponding positions. This display is done by, for example, a display unit (not shown) in the verification unit 710 of the image-verification apparatus 12 in FIG. 7. The display is performed after the process in each of steps S809, S810, and S817 is completed. It may sometimes be impossible to specify the alteration position. More specifically, first, the presence of alteration is determined because the pieces of inter-block-magnitude-relation information RB and RB' are different. However, if the pieces of inter-cell-magnitude-relation information RS and RS' are equal in both blocks of the block pair, the alteration position TPS cannot be specified. In this case, both blocks of the block pair are displayed with a yellow mark different from the red mark to be used when the alteration position is specified, thereby indicating that the alteration position is unknown. Note that any color other than red and yellow is applicable if it can distinguish specified and unspecified alteration positions.

Figure 14A:
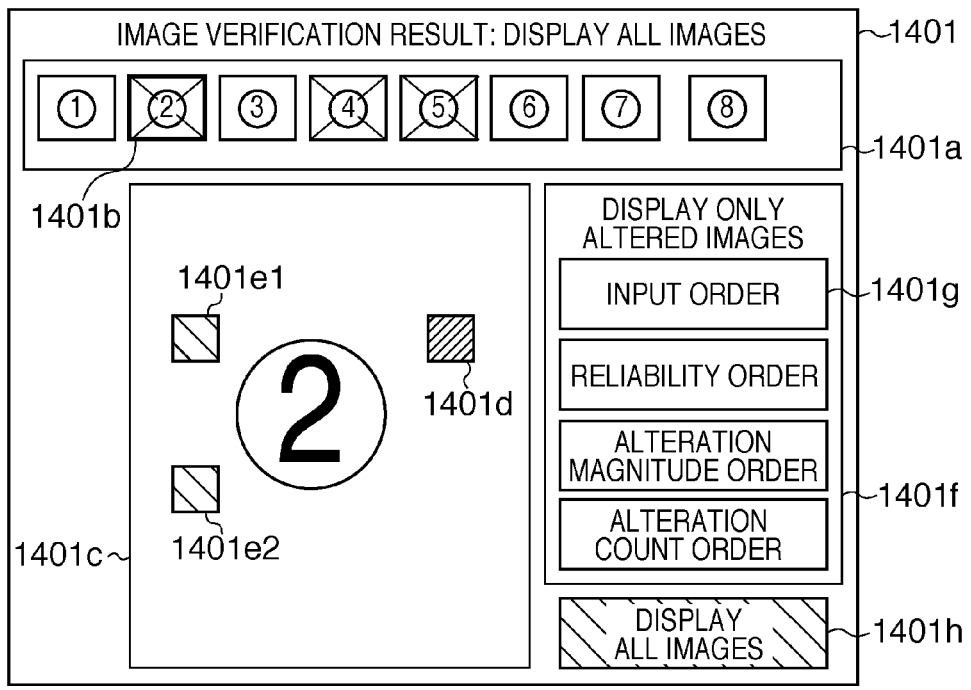
FIGS. 14A and 14B are views showing a display example of an image-verification result according to the fourth modification of the first embodiment.
Figure 14B:
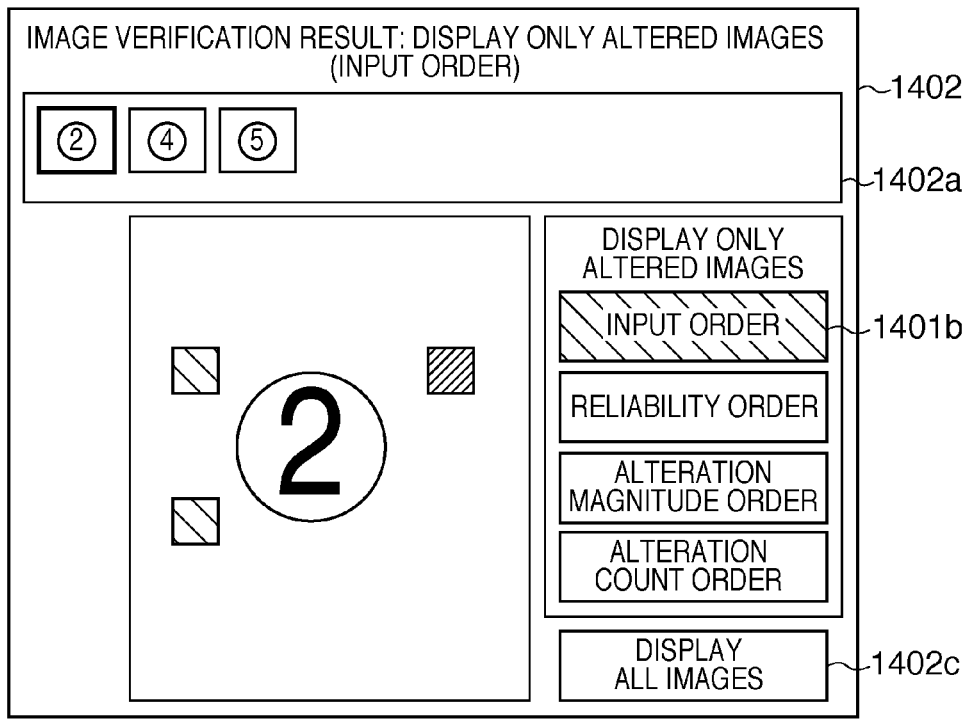

In addition, the display level may be changed in accordance with the level of the alteration-position-specifying result. In FIG. 14A, 1401c indicates a detailed display example of the image-verification result. If the specified alteration position TPS is represented by a densely hatched block, as indicated by 1401d. If an alteration is specified, but its position is not specified, both blocks of the block pair are represented by coarsely hatched blocks, as indicated by 1401e1 and 1401e2. Changing the display level in this way facilitates perception of the level of the alteration-position-specifying result.

In this embodiment, the alteration position is specified in the image-verification processing after determining the presence/absence of an alteration in all block pairs. However, the alteration presence/absence determination and alteration-position specifying may be done in each block pair. Since this is implemented as serial processing, the memory and the like can be saved.

As described above, according to the embodiment, hierarchical verification data are generated for image data. This allows alteration positions (in the entire image and in each block) to be hierarchically specified. The magnitude relation between blocks is used as verification data. As a feature, the magnitude relation hardly changes even when the image data has undergone image-reproduction processing such as gamma-correction processing, contrast-correction processing, and white-balance-correction processing. It is therefore possible to certify the integrity of image data that has undergone image-reproduction processing.

Note that in this embodiment, an example has been described in which a cell pair includes the upper left cell and the lower right cell in a block as members. However, the cell pairs may also be selected using random numbers, like block pairs. More specifically, two of four cells of a block of interest may be determined as the member of a cell pair using random numbers. Alternatively, all the four cells may be rearranged at random, and two cell pairs may be selected.

In the embodiment, the block size is 2×2 pixels, and the cell size is 1×1 pixel. However, the present invention is not limited to this. However, caution is necessary because the block size corresponds to the accuracy of specifying an alteration position.

In the embodiment, an example has been described in which the image data I is divided into blocks serving as a first unit, and the blocks are further divided into cells serving as a second unit, thereby hierarchically specifying alteration positions (in the entire image and in each block). In the present invention, however, other concepts may be applied as the first and second units. For example, assuming that the image data I is a moving image, a frame is used as the first unit, and a block is used as the second unit, thereby hierarchically specifying alteration positions (in the entire moving image and in each frame).

<First Modification>

In the above-described method, when the number of block pairs maintaining the magnitude relation is smaller than the threshold TH1, the presence of an alteration (NG) is determined. In this modification, the presence/absence of an alteration is determined based on whether parts where the magnitude relation is not maintained are adjacent to each other. For example, in the image 901 shown in FIG. 9, the blocks 901a1 and 901b1 do not maintain the magnitude relation and are adjacent to each other. Hence, the presence of an alteration (NG) is determined.

<Second Modification>

Note that in this embodiment, the image input apparatus obtains the inter-block-magnitude-relation information RB and the inter-cell-magnitude-relation information RS, and generates verification data using these pieces of information. However, the image input apparatus 11 may obtain block coefficients and cell coefficients and generate verification data using the coefficients. Then, the image-verification apparatus 12 may calculate the inter-block-magnitude-relation information RB and the inter-cell-magnitude-relation information RS from the received verification data.

More specifically, in the image input apparatus 11, the block-coefficient-calculation unit 403 calculates block coefficients, and the cell-coefficient-calculation unit 407 calculates cell coefficients. The block coefficients and the cell coefficients are input to the verification-data-generation unit 410 to calculate verification data. In this case, the block-pair-selection unit 404, the inter-block-magnitude-relation-information-calculation unit 405, the cell-pair-selection unit 408, and the inter-cell-magnitude-relation-information-calculation unit 409 do not perform processing. In the image-verification apparatus 12, the block-coefficient-calculation unit 703 calculates block coefficients, and the cell-coefficient-calculation unit 707 calculates cell coefficients. The block coefficients and the cell coefficients are input to the verification unit 710 and compared with the verification data to verify the image.

More specifically, the verification can be done by forming pairs of blocks and cells, and determining whether the magnitude relation is maintained.

Note that the magnitude relation may be calculated not in a pair but in a set of three or more block coefficients or cell coefficients.

For example, the magnitude relation of three coefficients, A, B, and C is expressed by 2 bits. If the coefficient A is the largest, the magnitude relation is represented by "00". If the coefficient B is the largest, the magnitude relation is represented by "01". If the coefficient C is the largest, the magnitude relation is represented by "10". If there are a plurality of largest coefficients, the magnitude relation is represented by "11".

Not the magnitude relation, but the variance, median value, or the average of a plurality of block coefficients or cell coefficients may be used.

For example, when block pairs or cell pairs are used, as in the above-described embodiment, the average of one block coefficient and the other block coefficient is usable.

If three or more blocks or cells are put into a group, the average or variance of the coefficients of the group may be used.

<Third Modification>

In the embodiment, the upper left cell and the lower right cell in a block are selected as a cell pair. However, one cell may be selected from a block, and the other cell may be selected outside the block. This makes it possible to easily detect an alteration that does not change the magnitude relation in a block because, for example, the same value is added/subtracted to/from the brightnesses of all pixels in the block.

More specifically, the cell-pair-selection unit 408 of the image input apparatus 11 and the cell-pair-selection unit 708 of the image-verification-apparatus 12, which executes the same processing as that of the cell pair selection unit 408, perform different processes. In each block, the cell-pair-selection unit 408 selects one cell of a cell pair from pixels in the block. For example, the pixel of the upper left corner of each block is selected. However, any pixel in a block can be selected, or the cell may be selected using a random number. The other cell is selected outside the block using a random number. However, the cell is preferably not selected from the other block of the block pair. This is because the verification unit 710 which has already determined the block pair as the altered block pair TPB compares cells of blocks which have been altered at a high possibility, and a determination error readily occurs. In this case, the same selection method as that of, for example, the block-pair-selection unit 404 is used, and the same random number algorithm and initial set value of random number generation as that of the cell-pair-selection unit 708 of the image-verification-apparatus 12 may be used.

Figure 12:
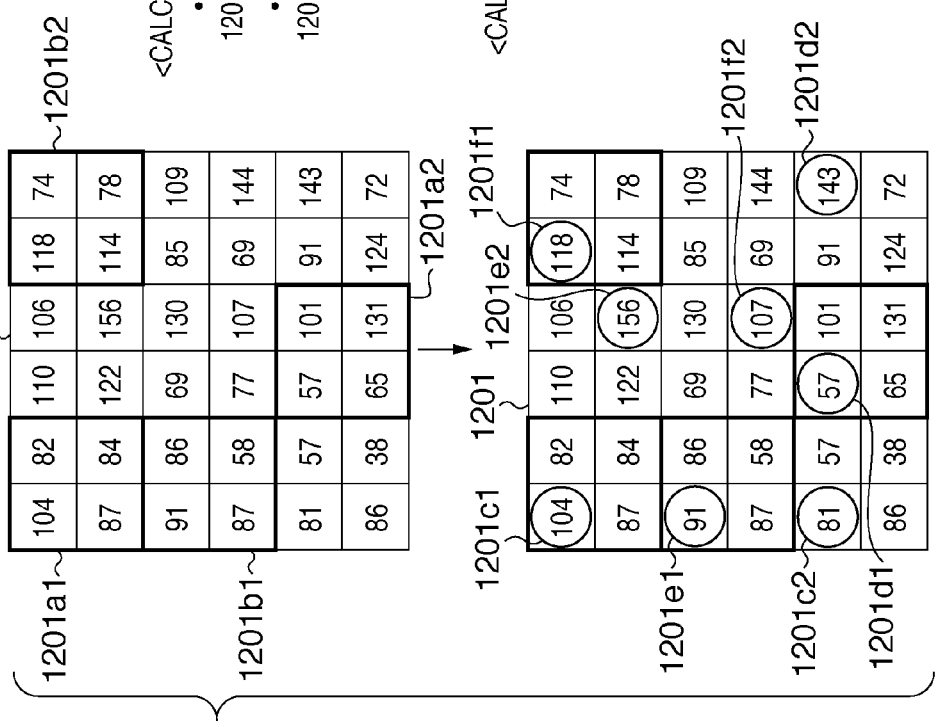
FIG. 12 is a view showing a calculation example of inter-block and inter-cell magnitude-relation information according to the third modification of the first embodiment.

First, a detailed example of calculation of the inter-block-magnitude-relation information RB and the inter-cell-magnitude-relation information RS using the above-described method will be described with reference to FIG. 12. FIG. 12 basically illustrates the same structure as in FIG. 6, and only a different portion will be described.

Although the image indicated by reference numeral 601 in FIG. 6 has 9×9 pixels, reference numeral 1201 in FIG. 12 denotes an image having 6×6 pixels for easier understanding of the cell-pair-selection method that is the characteristic feature of the modification. The following two block pairs are selected.

1201a1 and 1201a2 (block pair 1201a)
1201b1 and 1201b2 (block pair 1201b)

As in FIG. 6, the pieces of inter-block-magnitude-relation information RB are calculated as RB(1201a)=0
RB(1201b)=1 where RB(X) represents the magnitude relation of a block pair X calculated by expressions (1).

Next, the inter-cell-magnitude-relation information RS is calculated, as in FIG. 6, though the processing of the cell-pair-selection unit 408 of the image input apparatus 11 is different.

In the image indicated by reference numeral 1201 shown in FIG. 12, the upper left pixel in each block and a pixel selected outside the block using a random number, which are marked by circles, are selected as a cell pair. The cell pair of the block 1201a1 includes pixels 1201c1 and 1201c2. The cell pair of the block 1201a2 includes pixels 1201d1 and 1201d2. The cell pair of the block 1201b1 includes pixels 1201e1 and 1201e2. The cell pair of the block 1201b2 includes pixels 1201f1 and 1201f2.

The pieces of inter-cell-magnitude-relation information RS are calculated, as in FIG. 6, as RS(1201c1 and 1201c2)=0
RS(1201d1 and 1201d2)=1
RS(1201e1 and 1201e2)=1
RS(1201f1 and 1201f2)=0 where RS(A and B) represents the magnitude relation of brightness between the pixels A and B of the cell pair in FIG. 12, which is calculated by expressions (2).

Figure 13:
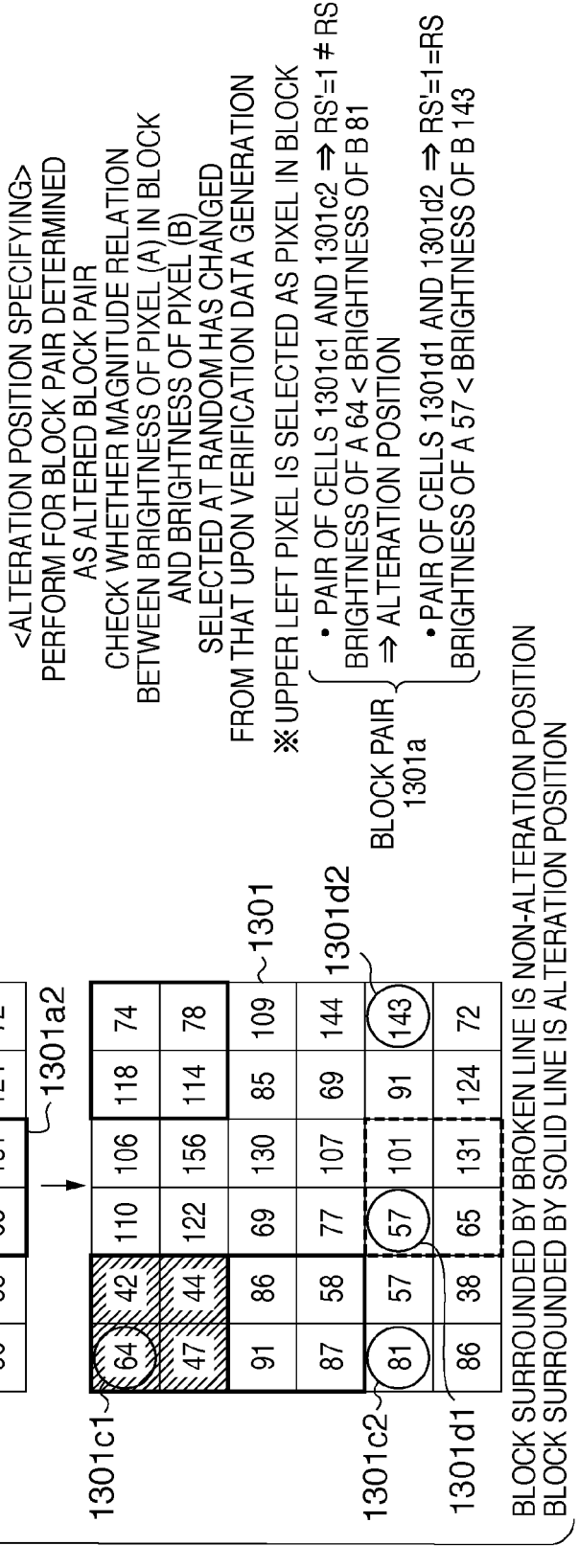
FIG. 13 is a view showing an example of image-verification processing according to the third modification of the first embodiment.

A detailed example of an alteration presence/absence determination and an alteration-position specifying using the above-described method will be described next with reference to FIG. 13. FIG. 13 basically illustrates the same structure as in FIG. 9, and only a different portion will be described.

In FIG. 13, reference numeral 1301 denotes an image obtained by altering the image denoted by reference numeral 1201 in FIG. 12. Hatched pixels represent altered portions. All pixels in a block 1301a1 are altered. Note that the brightnesses of all the hatched pixels are lower than the original brightnesses by 40 because of the alteration.

The following two block pairs are selected, as in FIG. 12.

1301a1 and 1301a2 (block pair 1301a)
1301b1 and 1301b2 (block pair 1301b)

As in FIG. 9, the pieces of inter-block-magnitude-relation information RB' are calculated as RB'(1301a)=1
RB'(1301b)=1

After that, RB is compared with RB'. In FIG. 13, RB equals RB' in the block pair 1301b. On the other hand, RB does not equal RB' in the block pair 1301a. The number of block pairs of the image denoted by reference numeral 1301 in FIG. 13 is small. Assume that the threshold TH1 is 2. The number of block pairs maintaining the magnitude relation is one, which is less than the threshold TH1. Hence, the block pair 1301a is the altered block pair TPB, and the presence of an alteration (NG) is determined.

Next, the alteration positions TPS are specified as in FIG. 9. The processing of the cell-pair-selection unit 708 of the image-verification-apparatus 12 is different. For example, in FIG. 13, cell pairs are selected as in FIG. 12. In the image denoted by reference numeral 1301, the upper left pixel of each block and a pixel selected outside the block using a random number, which are marked by circles, are selected as a cell pair. Cell pairs are selected for the block pair 1301a including the blocks 1301a1 and 1301a2, which is determined as an altered block pair. The cell pair of the block 1301a1 includes pixels 1301c1 and 1301c2. The cell pair of the block 1301a2 includes pixels 1301d1 and 1301d2.

As in FIG. 9, the pieces of inter-cell-magnitude-relation information RS' are calculated as RS'(1301c1 and 1301c2)=1
RS'(1301d1 and 1301d2)=1

The pair of cells 1301c1 and 1301c2, whose RS and RS' are different, is determined as the alteration position TPS. Note that as described above, the alteration position TPS can be displayed by red, yellow, or hatching using the display unit (not shown) in the verification unit 710 of the image-verification-apparatus 12 shown in FIG. 7.

Note that in the above-described method, for one cell in a block, one cell outside the block is selected to create one cell pair. However, for one cell in a block, a plurality of cells outside the block may be selected to create a plurality of cell pairs. This allows the apparatus to more accurately specify whether the block is an alteration position. A detailed method will be explained with reference to FIGS. 16A, 17, and 18.

Figure 17:
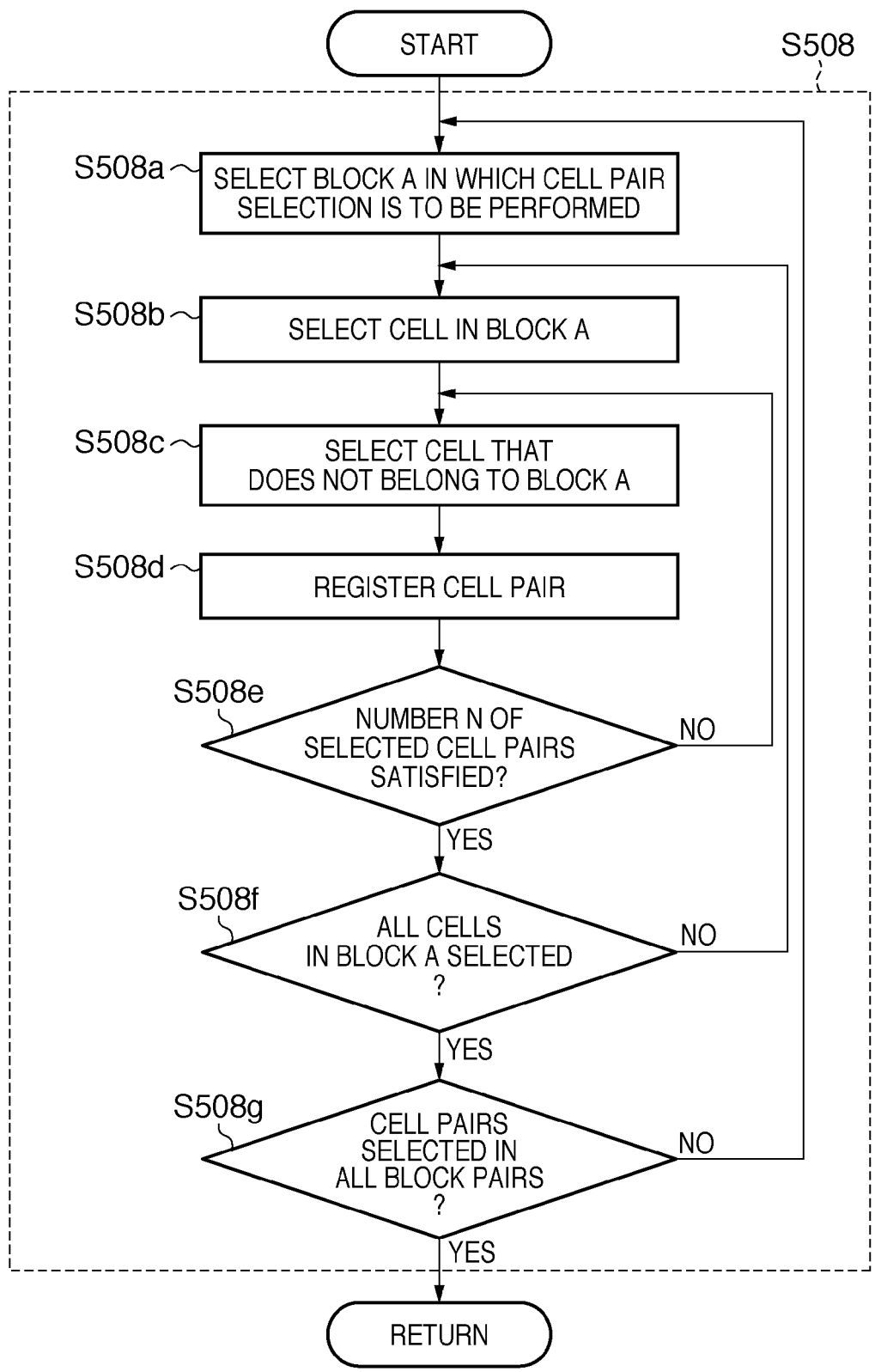
FIG. 17 is a flowchart illustrating the procedure of cell-pair-selection processing according to the third modification of the first embodiment.
Figure 18:
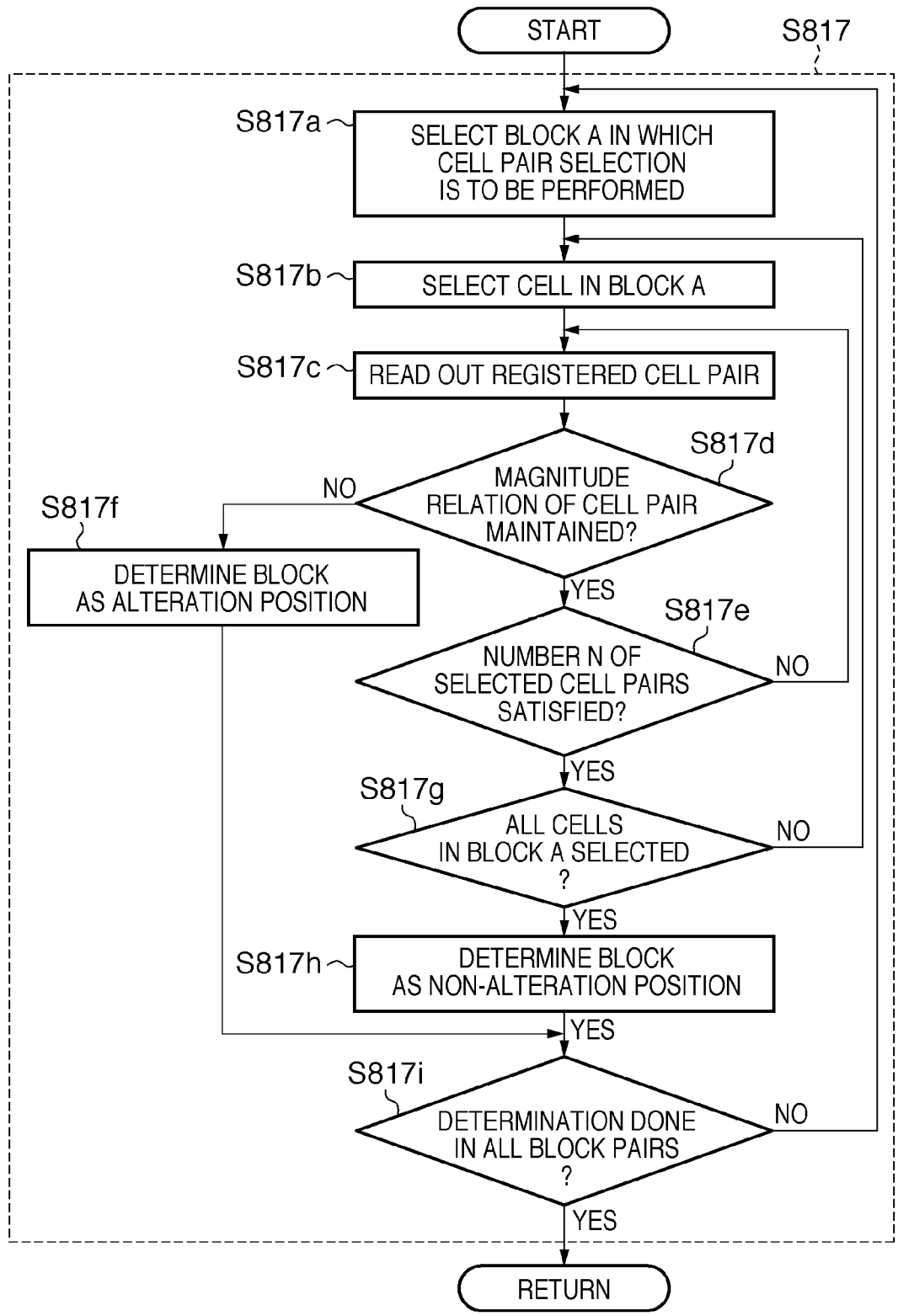
FIG. 18 is a flowchart illustrating the procedure of alteration-position-specifying processing according to the third modification of the first embodiment.

FIG. 16A is a conceptual view of a cell pair selection method. FIG. 17 illustrates a detailed procedure of cell-pair-selection processing in step S508 of FIG. 5. FIG. 18 illustrates a detailed procedure of alteration-position-specifying processing in step S817 of FIG. 8.

Cell-pair-selection processing will be described in accordance with the procedure shown in FIG. 17. Each step of the procedure in FIG. 17 is processed by the cell-pair-selection unit 408. In step S508a, the cell-pair-selection unit 408 selects a block A in which cell-pair-selection is to be performed. The block A is a block that has been selected for a block pair. In FIG. 16A, a block 1601*a* is selected as the block A. In step S508*b*, a cell in the block A is selected. In FIG. 16A, a cell 1601*b* is selected. In step S508*c*, a cell that does not belong to the block A is selected. In FIG. 16A, a cell 1601*c* is selected. In step S508*d*, the cell pair is registered. In step S508*e*, it is determined whether the number N of selected cell pairs is satisfied. If YES, the process advances to step S508*f*. If NO, the process returns to step S508*c*. In FIG. 16A, since N is 3, the process returns to step S508*c* to select cells 1601*d* and 1601*e* to be paired with the cell 1601*b*. As a result, a total of three cell pairs are formed by the cells 1601*b* and 1601*c*, 1601*b* and 1601*d*, and 1601*b* and 1601*e*. In step S508*f*, it is determined whether all cells in the block A are selected. If YES, the process advances to step S508*g*. If NO, the process returns to step S508*b*. In FIG. 16A, cell pairs are selected even for cells other than the cell 1601*b* of the block 1601*a*, as described above. Note that it is not always necessary to select pairs for all cells in a block. Finally, in step S508*g*, it is determined whether cell pairs are selected in all block pairs. If YES, the process in step S508 ends. If NO, the process returns to step S508*a*. In FIG. 16A, cell pairs are selected even in blocks other than the block 1601*a*, and the processing ends. The detailed procedure of step S508 has been described above. Cell-pair-selection processing in step S815 of FIG. 8 is also executed in accordance with the same procedure.

Alteration-position-specifying processing will be described next in accordance with the procedure shown in FIG. 18. Each step of the procedure in FIG. 18 is processed by the second verification unit 1103. Step S817*a* is processed like step S508*a* of FIG. 17. In FIG. 16A, the block 1601*a* is selected as the block A. Step S817*b* is processed like step S508*b* of FIG. 17. In FIG. 16A, the cell 1601*b* is selected. In step S817*c*, the registered cell pair is read out. In FIG. 16A, the pairs of cells 1601*b* and 1601*c* is read out. In step S817*d*, it is determined whether the magnitude relation of the cell pair is maintained. If YES, the process advances to step S817*e*. If NO, the process advances to step S817*f*. In step S817*e*, it is determined whether the number N of selected cell pairs is satisfied. If YES, the process advances to step S817*g*. If NO, the process returns to step S817*c*. In step S817*g*, it is determined whether the cells in the block A are selected. If YES, the process advances to step S817*h*. If NO, the process returns to step S817*b*. In step S817*f*, when the magnitude relation of one cell pair in the block A is not maintained, the block A is determined as an alteration position. Instead, a threshold may be provided, and when the number of cell pairs that do not maintain the magnitude relation in the block is equal to or larger than a predetermined number, the block may be determined as an alteration position. In step S817*h*, when all cell pairs in the block A maintain the magnitude relation, the block A is not determined as an alteration position. In FIG. 16A, assume that the cell 1601*b* is altered. In this case, it can be specified as an alteration position if at least one of the pairs of cells 1601*b* and 1601*c*, 1601*b* and 1601*d*, and 1601*b* and 1601*e* does not maintain the magnitude relation. Finally, in step S817*i*, it is determined whether the determination is done in all block pairs. If YES, the process in step S817 ends. If NO, the process returns to step S817*a*.

For one cell in a block, one cell outside the block is selected. The cell may exist in a block of another block pair. This allows the apparatus to determine by checking the magnitude relation of the block pair including the cell whether the coefficients of cells outside the block are correct. It is therefore possible to more accurately determine whether the inter-cell-magnitude-relation information is maintained. As a result, it can more accurately be specified whether the block is an alteration position. A detailed method will be explained with reference to FIGS. 16B, 19, and 20.

Figure 19:
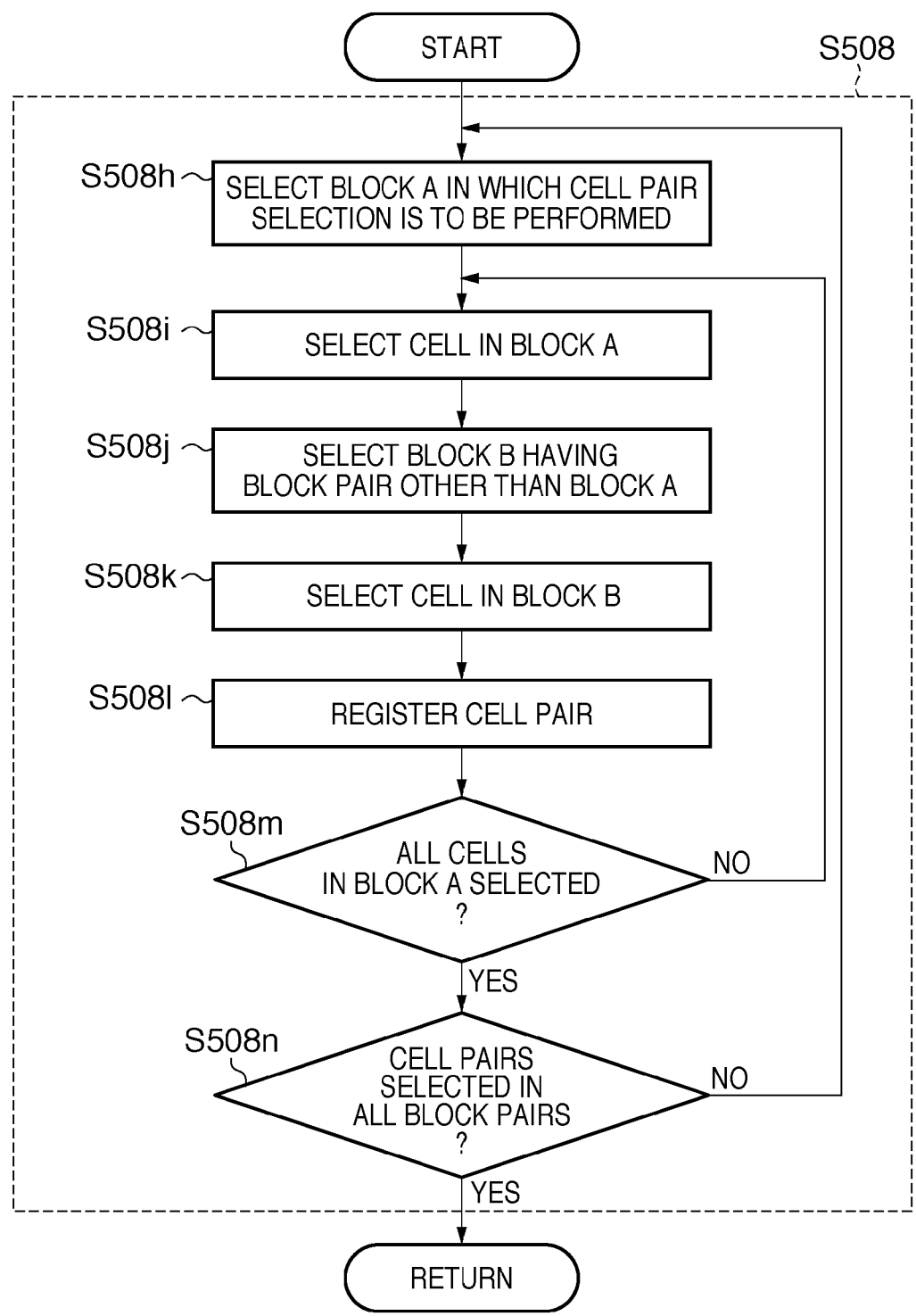
FIG. 19 is a flowchart illustrating the procedure of cell-pair-selection processing according to the third modification of the first embodiment.
Figure 20:
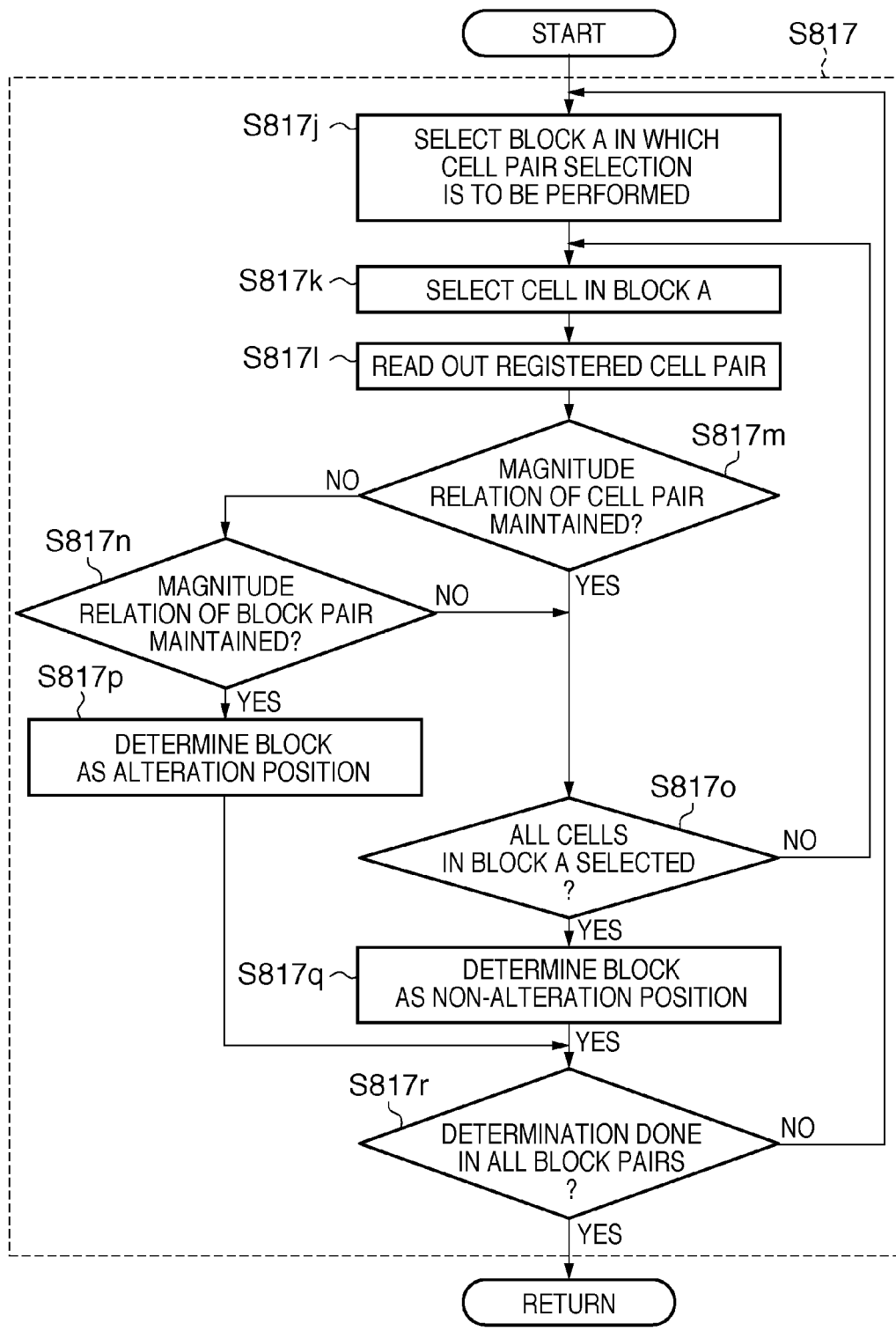
FIG. 20 is a flowchart illustrating the procedure of alteration-position-specifying processing according to the third modification of the first embodiment.

FIG. 16B is a conceptual view of a cell-pair-selection method. FIG. 19 illustrates a detailed procedure of cell-pair-selection processing in step S508 of FIG. 5. FIG. 20 illustrates a detailed procedure of alteration-position-specifying processing in step S817 of FIG. 8.

Cell-pair-selection processing will be described in accordance with the procedure shown in FIG. 19. Each step of the procedure in FIG. 19 is processed by the cell-pair-selection unit 408. In step S508*h*, the cell-pair-selection unit 408 selects the block A in which cell-pair selection is to be performed. The block A is a block that has been selected for a block pair. In FIG. 16B, a block 1602*a* is selected as the block A. In step S508*i*, a cell in the block A is selected. In FIG. 16B, a cell 1602*b* is selected. In step S508*j*, a block B having a block pair other than the block A is selected. In FIG. 16B, a block 1602*d* is selected as the block B. In step S508*k*, a cell in the block B is selected. In FIG. 16B, a cell 1602*c* is selected. In step S508*l*, the cell pair is registered.

In FIG. 16B, the cells 1602*b* and 1602*c* are registered as a cell pair. In step S508*m*, it is determined whether all cells in the block A are selected. If YES, the process advances to step S508*n*. If NO, the process returns to step S508*i*. In FIG. 16B, cell pairs are selected even for cells other than the cell 1602*b* of the block 1602*a*, as described above. Note that it is not always necessary to select pairs for all cells in a block. Finally, in step S508*n*, it is determined whether cell pairs are selected in all block pairs. If YES, the process in step S508 ends. If NO, the process returns to step S508*h*. In FIG. 16B, cell pairs are selected even in blocks other than the block 1602*a*, and the processing ends. The detailed procedure of step S508 has been described above. Cell-pair-selection processing in step S815 of FIG. 8 is also executed in accordance with the same procedure.

Alteration-position-specifying processing will be described next in accordance with the procedure shown in FIG. 20. Each step of the procedure in FIG. 20 is processed by the second verification unit 1103. Step S817*a* is processed like step S508*h* of FIG. 19. In FIG. 16B, the block 1602*a* is selected as the block A. Step S817*k* is processed like step S508*i* of FIG. 19. In FIG. 16B, the cell 1602*b* is selected. In step S817*l*, the registered cell pair is read out. In FIG. 16B, the pairs of cells 1602*b* and 1602*c* is read out. In step S817*m*, it is determined whether the magnitude relation of the cell pair is maintained. If YES, the process advances to step S817*o*. If NO, the process advances to step S817*n*. In step S817*n*, it is determined whether the magnitude relation between the block B and the block paired with the block B is maintained. If YES, the process advances to step S817*p*. If NO, the process advances to step S817*o*. In step S817*o*, it is determined whether the cells in the block A are selected. If YES, the process advances to step S817*q*. If NO, the process returns to step S817*k*. In step S817*p*, when the magnitude relation of one cell pair is not maintained, and the magnitude relation between the block B and the block paired with the block B is maintained, the block A is determined as an alteration position. Instead, a threshold may be provided, and when the number of cell pairs that do not maintain the magnitude relation in the block is equal to or larger than a predetermined number, the block may be determined as an alteration position. In step S817*q*, when all cell pairs in the block A maintain the magnitude relation, the block A is not determined as an alteration position. In FIG. 16B, the block B is the block 1602*d* which is paired with a block 1602*e*. For example, assume that the magnitude relation of the pair of cells 1602*b* and 1602*c* is not maintained, and the magnitude relation of the pair of blocks 1602*d* and 1602*e* is maintained. In this case, the block 1602*a* is an alteration position.

Finally, in step S817*r*, it is determined whether the determination is done in all block pairs. If YES, the process in step S817 ends. If NO, the process returns to step S817*j*.

<Fourth Modification>

In this embodiment, only image verification of one image data I' is performed. As a modification, image verification of a plurality of image data may be performed, and the results may be displayed together on an interface. Note that at this time, the images are displayed as thumbnails in a smaller size for the sake of visibility. Hence, the user can easily visually recognize the verification result of an altered image.

FIGS. 14A and 14B and FIGS. 15A and 15B are views showing display examples of an image-verification result. Reference numeral 1401 in FIG. 14A denotes a GUI which displays the verification results of all eight images received by the image-verification apparatus 12. An area 1401*a* displays the thumbnails of the images from left to right in the order of input. Images determined to be altered have a "×" mark to so as to be distinguished from images determined not to be altered, as indicated by 1401*b*. This is merely an example, and any other method, such as blinking an image itself is usable if it can distinguish the presence/absence of an alteration. An area 1401*c* displays the original image of a selected one of the thumbnails in the area 1401*a*. In FIG. 14A, the original image of the thumbnail 1401*b* is selected. To indicate the selection, the image 1401*b* has a thick outer frame. Note that marks 1401*d*, 1401*e*1 and 1401*e*2 in the area 1401*c* indicate alteration positions, as described above. The mark 1401*d* indicates a specified alteration position, and is displayed as a densely hatched block. The marks 1401*e*1 and 1401*e*2 indicate unspecified alteration positions, and are displayed as coarsely hatched blocks. A GUI 1402 in FIG. 14B and GUIs in FIGS. 15A and 15B also display alteration positions in the same manner.

Figure 15A:
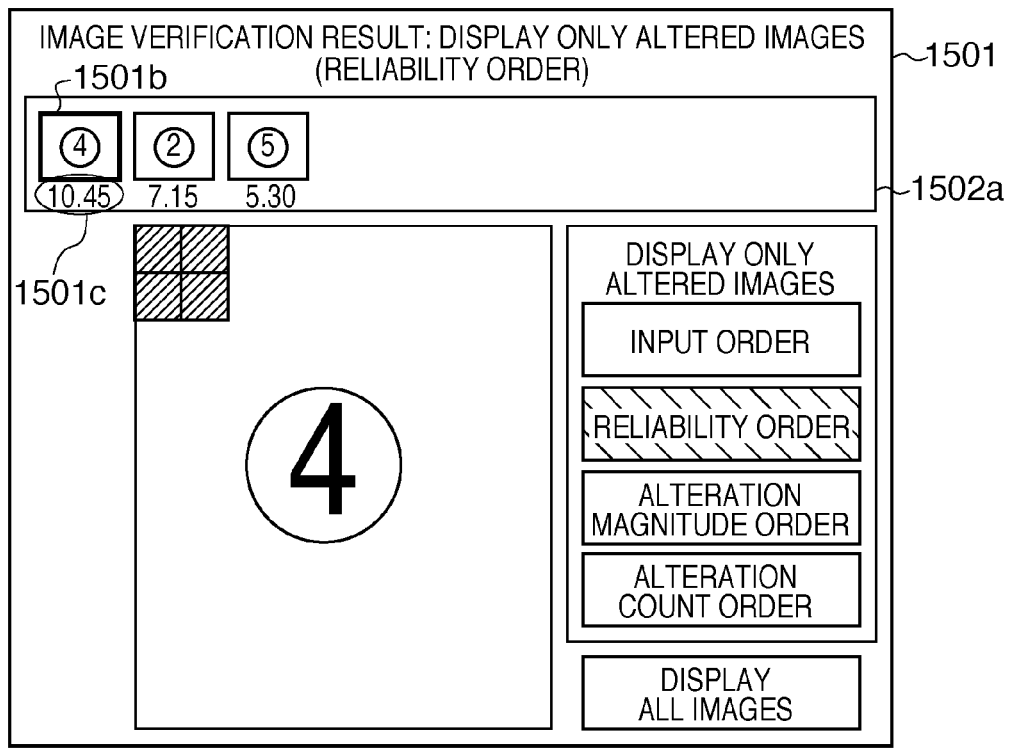
FIGS. 15A and 15B are views showing another display example of the image-verification result according to the fourth modification of the first embodiment.
Figure 15B:
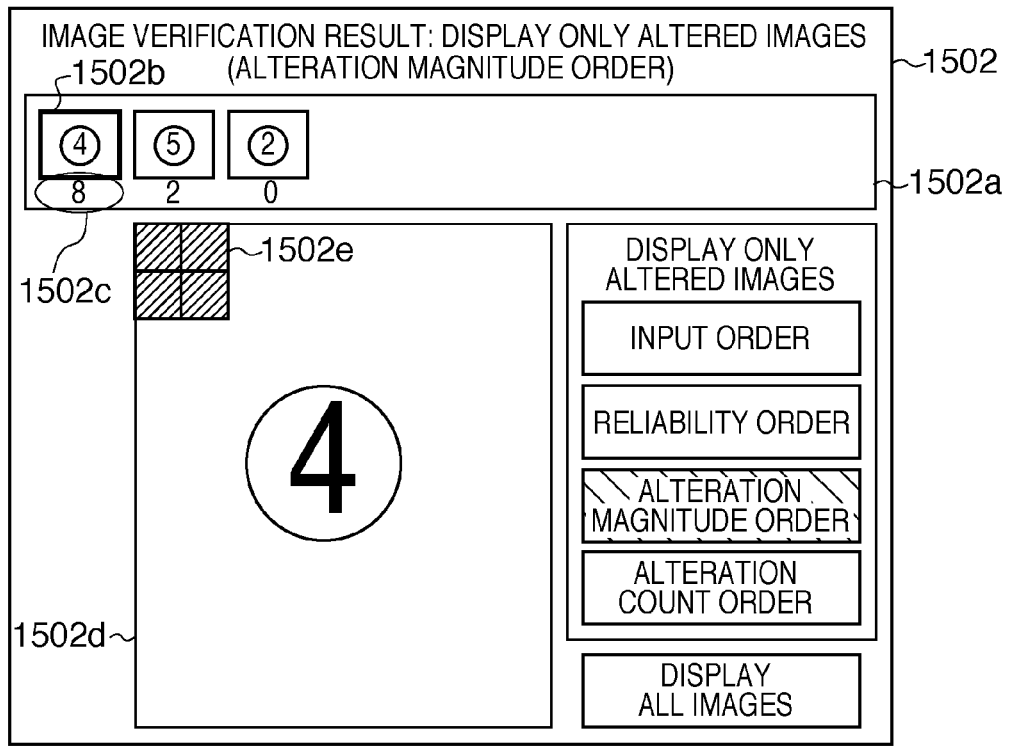

Option-selection buttons to be used to display only altered images are arranged in an area 1401*f*. For example, when an "input order" button 1401*g* is selected, the screen of the GUI 1401 transits to the GUI 1402. As indicated by the GUI 1402 in FIG. 14B, for "input order", the images determined as altered images are sorted in the input order and displayed. An area 1402*a* displays the thumbnails of the images without the "×" mark, unlike the image 1401*b*. Since only altered images are displayed, the presence/absence of alteration need not be distinguished. An "input order" button 1401*h* is hatched to indicate that the images are displayed in the "input order". Note that to return to the screen of the GUI 1401, a "display all images" button 1402*c* is selected. Note that a button 1401*h* has the same function as that of the button 1402*c*, and is hatched to indicate that "all images" are displayed. Display of selection buttons and the function of the "display all images" button in FIGS. 15A and 15B are the same as described above.

Reverting to the description of the buttons in the area 1401*f*, a "reliability order" button is used to sort the images in the order of reliability which represents, for example, how far the blocks of an altered block pair are apart from each other. Note that the reliability is determined based on the fact that alteration at one portion affects two blocks that are spaced part from each other less. For example, the screen transits to that of a GUI 1501 in FIG. 15A. An area 1501*a* displays the thumbnails of the images arranged from left to right in descending order of reliability. A thumbnail 1501*b* represents the image having the highest reliability. An area 1501*d* displays the original image of the thumbnail 1501*b*. The thumbnail of each image has the reliability value displayed below. For example, the reliability of the image 1501*b* is "10.45", as indicated by 1501*c*. As a detailed reliability calculation method, letting (x1,y1) and (x2,y2) be the coordinates of the upper left pixels of the blocks of an altered block pair, a distance L between the blocks is calculated by $$L=\{(x1-x2)^2+(y1-y2)^2\}^{1/2} \quad (3)$$

The distances L of all altered block pairs are obtained, and the average is defined as the reliability. For example, in the image 901 shown in FIG. 9, the block pairs 901*a* and 901*b* are altered block pairs. The coordinates of the upper left pixel of the block 901*a*1 are (0,0), and those of the upper left pixel of the block 901*a*2 are (6,6). In this case, the distance L of the block pair 901*a* is L=8.49. The coordinates of the upper left pixel of the block 901*b*1 are (0,2), and those of the upper left pixel of the block 901*b*2 are (4,0). In this case, the distance L of the block pair 901*b* is L=4.47. Hence, the reliability= (8.49+4.47)÷2=6.48.

As another reliability, a case in which an alteration position can be specified in an altered block pair is defined as "1", and a case in which alteration can be specified but its position cannot be detected is defined as "0.5", thereby obtaining an alteration-specifying level. The alteration-specifying levels of all altered block pairs are obtained, and the average is used as the reliability. Any other index capable of expressing reliability is usable.

An "alteration magnitude order" button is used to sort the images in descending order of, for example, the magnitude of the alteration position TPS in an image. For example, the screen transits to that of a GUI 1502 in FIG. 15B. An area 1502*a* displays the thumbnails of the images arranged from left to right in descending order of alteration magnitude. A thumbnail 1502*b* represents the image having the largest alteration magnitude. An area 1502*d* displays the original image. The thumbnail of each image has the reliability value displayed below. For example, the reliability of the image represented by the thumbnail 1502*b* is "8", as indicated by reference numeral 1502*c*.

As a detailed alteration-magnitude-calculation method, first, at each alteration position, the number P of adjacent blocks corresponding to alteration positions is counted. For example, the block 901*a*1 in FIG. 9 is an alteration position, and the adjacent block 901*b*1 is also an alteration position. Hence, P=1. For the block 901*b*1 as well, the block 901*a*1 as an alteration position is adjacent, and P=1. The sum of P at all alteration positions is defined as the alteration magnitude. For example, in the image 901 shown in FIG. 9, P of the alteration position block 901*a*1 and P of the block 901*b*1 are added to obtain "2" as the alteration magnitude. In the image displayed in the area 1502*d* in FIG. 15B, each of the four blocks is adjacent to two blocks, as indicated by reference numeral 1502*e*. Hence, the alteration magnitude is four blocks×2=8. Note that any other index capable of defining the alteration magnitude is usable.

An "alteration count order" button is used to sort the images in descending order of the number of alteration positions in an image. The display method is the same as in FIGS. 15A and 15B described above. For example, alteration positions in the image 901 in FIG. 9 are the blocks 901*a*1 and 901*b*1, and the number of alteration positions is 2. Note that any other index capable of defining the number of alteration positions is usable.

Note that the above-described interface is merely an example, and images may be sorted in the order of image size or the like. The interface can be operated using, for example, a mouse or a touch panel.

Second Embodiment

In the second embodiment, assuming that image data I is moving image data, focus is placed on the presence of a frame that is a unit larger than a block. An example will be described in which an alteration presence/absence determination and alteration-position specifying are executed in three layers using a frame newly as a third unit, a block as a first unit, and a cell as a second unit.

Figure 2:
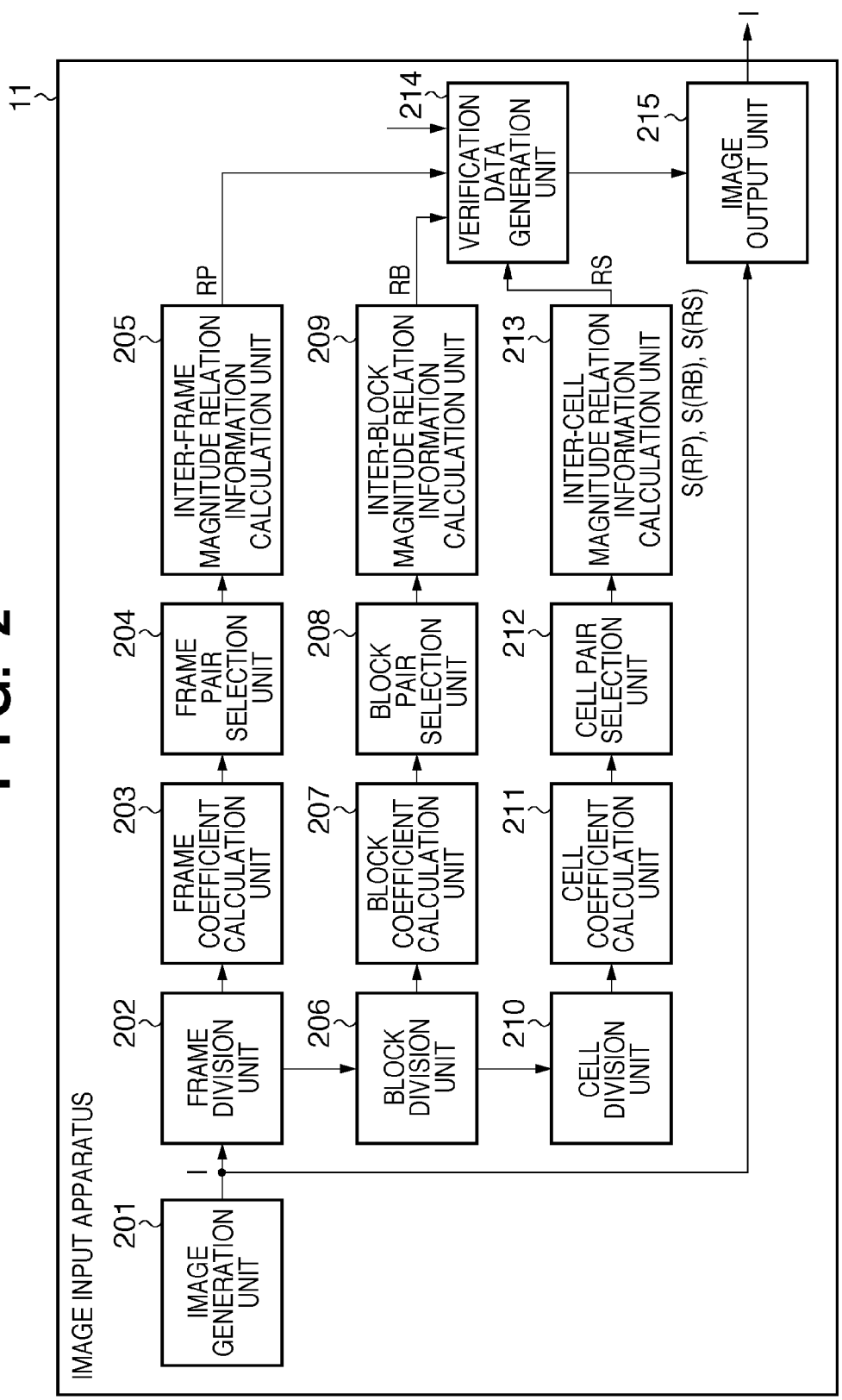
FIG. 2 is a block diagram showing the detailed arrangement of an image input apparatus according to the second embodiment.

FIG. 2 shows an image input apparatus 11 according to the second embodiment. Note that an image-generation unit 201, a block-coefficient-calculation unit 207, a block-pair-selection unit 208, and an inter-block-magnitude-relation-information-calculation unit 209 perform the same processes as those of the units with the same names in FIG. 4, and a description thereof will not be repeated. The image-generation unit 201 functions as a moving-image-generation unit which generates frames sequentially along the time axis. The same applies to a cell-division unit 210, a cell-coefficient-calculation unit 211, a cell-pair-selection unit 212, and an inter-cell-magnitude-relation-information-calculation unit 213. A frame-division unit 202 functions as a moving-image input unit. The frame-division unit 202 divides the input moving image into frames, and outputs a frame-division result representing the positions of the frames to a frame-coefficient-calculation unit 203 and a block-division unit 206 of the succeeding stage.

The frame-coefficient-calculation unit 203, the frame-pair-selection unit 204, and the inter-frame-magnitude-relation-information-calculation unit 205 perform processing like block and cell processing described in the first embodiment. The frame coefficient is, for example, the average of brightnesses of pixels in cells, like the block coefficient described in the first embodiment. The median value or variance of brightnesses is also applicable. As a result, inter-frame magnitude-relation information RP as third verification data is calculated and supplied to a verification-data-generation unit 214 of the succeeding stage.

The block-division unit 206 divides each frame of the frame-division result output from the frame-division unit 202 of the preceding stage into blocks, and outputs the positions of the blocks and the pixel values to the block-coefficient-calculation unit 207 and the cell-division unit 210 of the succeeding stage.

The verification-data-generation unit 214 generates verification data S(RP), S(RB), and S(RS) including not only inter-block-magnitude-relation information RB and inter-cell-magnitude-relation information RS but also the inter-frame-magnitude-relation information RP using an electronic signature or a MAC, as in the first embodiment.

Figure 10B:
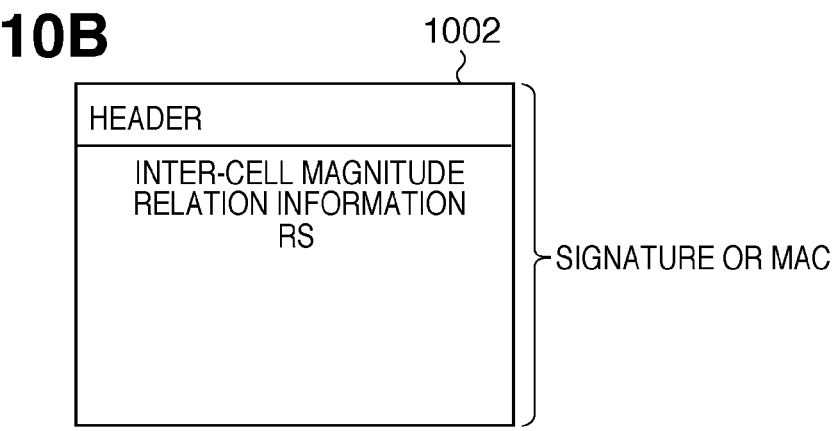
Figure 10C:
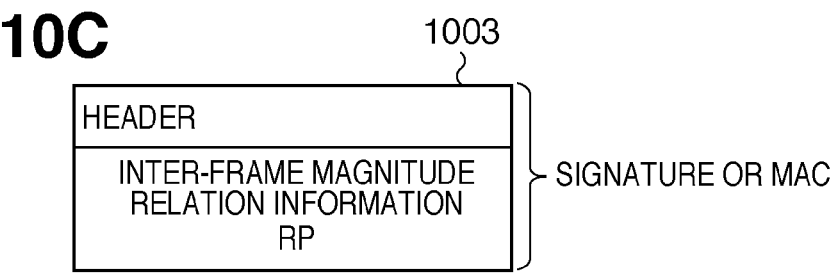

Note that the verification data S(RP), S(RB), and S(RS) have structures indicated by reference numeral 1003 in FIG. 10C, reference numeral 1001 in FIG. 10A, and reference numeral 1002 in FIG. 10B, respectively. The reference numeral 1003 in FIG. 10C indicates the structure of the verification data S(RB). The reference numeral 1001 in FIG. 10A indicates the structure of the verification data S(RB). Note that the reference numeral 1002 in FIG. 10B indicates the structure of the verification data S(RS), which is the same as in the first embodiment, and a description thereof will not be repeated. The pieces of magnitude-relation information RP and RB are arranged in the order of selection by random numbers. For example, the pieces of information RP are arranged in the order of RP of the first frame pair, RP of the second frame pair, . . . . The pieces of information RB are arranged in the order of RB of the first block pair in the first frame pair, RB of the second block pair in the first frame pair, RB of the first block pair in the second frame pair. . . .

The header of the verification data 1003 includes, for example, information of the total number of pieces of inter-frame-magnitude-relation information RP. The header of the verification data 1001 includes, for example, information of the total number of pieces of inter-block-magnitude-relation information RB and information of the number of block pairs in the frame pairs. To acquire a plurality of pieces of inter-block-magnitude-relation information RB in the selected Xth frame pair, pieces of information RB as many as the block pairs in each frame pair are acquired by skipping block pairs in (X-1) frame pairs from the top of the inter-block-magnitude-relation information RB of the verification data 1001. Verification data is thus generated. In this way, the verification-data-generation unit 214 generates verification data. An image-output unit 215 outputs the image data I with the verification data S(RP), S(RB), and S(RS) added.

The arrangement of the image input apparatus 11 according to the second embodiment has been described above. Note that the procedure of image-sensing processing according to the second embodiment is formed by adding frame division, frame-coefficient calculation, frame-pair selection, and inter-frame-magnitude-relation calculation between steps S501 and S502 of the procedure of the first embodiment shown in FIG. 5. As a result, the verification data S(RB) and S(RS) change to the verification data S(RP), S(RB), and S(RS).

Figure 3:
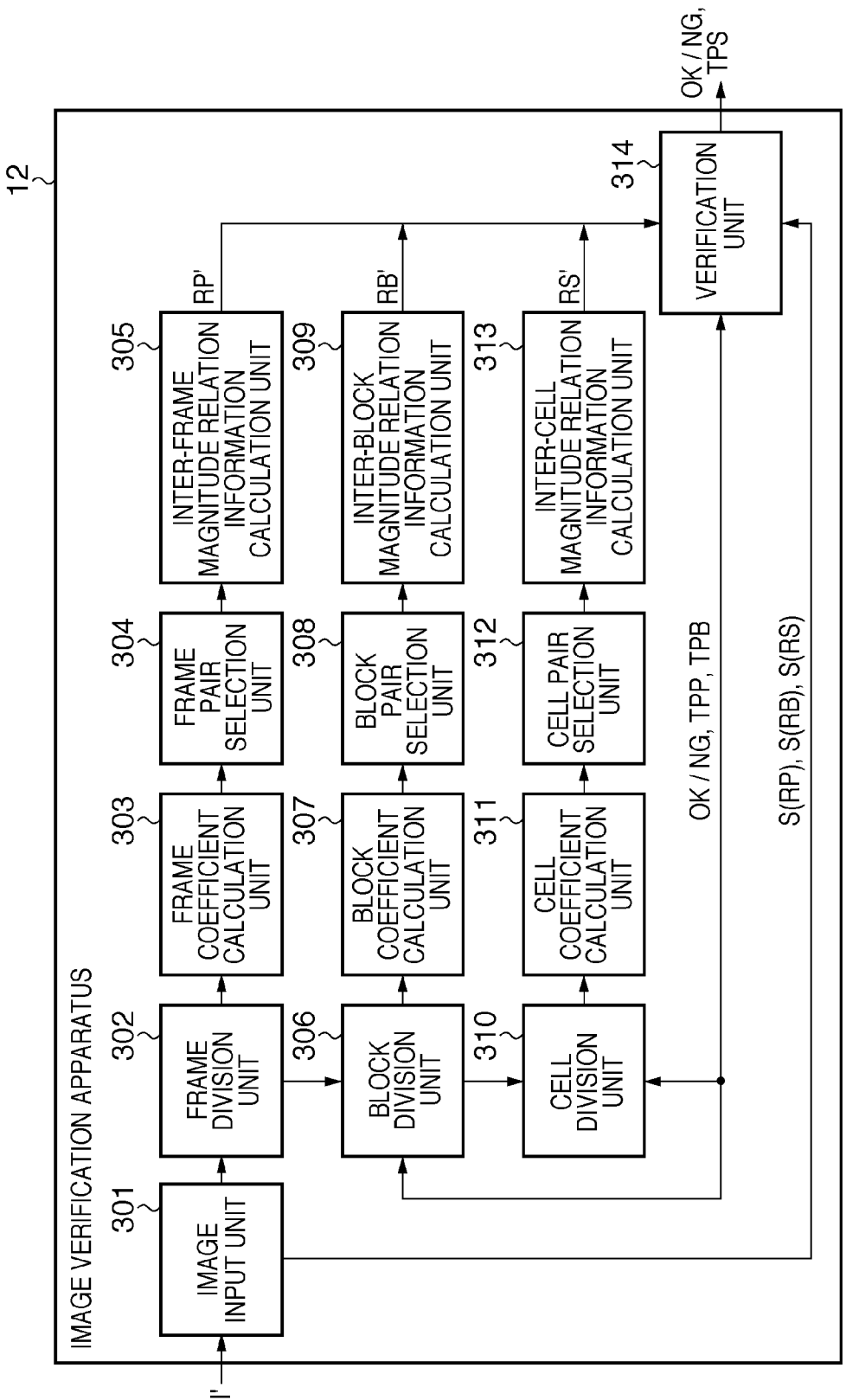
FIG. 3 is a block diagram showing the detailed arrangement of an image-verification apparatus according to the second embodiment.

FIG. 3 shows an image-verification apparatus 12 according to the second embodiment. An image input unit 301 inputs image data I'. The image input unit 301 analyzes the header of the image data I', extracts the added verification data S(RP), S(RB), and S(RS), outputs the extracted verification data S(RP), S(RB), and S(RS).

A frame-division unit 302, functioning as a third division unit, performs the same processing as that of the frame division unit 202 in FIG. 2, that is, divides the image data I' input from the image input unit 301 of the preceding stage into frames.

A frame-coefficient-calculation unit 303, a frame-pair-selection unit 304, and an inter-frame-magnitude-relation-information-calculation unit 305 perform the same processes as those of the units with the same names in FIG. 2. The inter-frame-magnitude-relation-information-calculation unit 305 calculates inter-frame-magnitude-relation information RP'.

A block-division unit 306, a block-coefficient-calculation unit 307, a block-pair-selection unit 308, and an inter-block-magnitude-relation-information-calculation unit 309 perform processing only when a verification unit 314 (to be described later) inputs the presence of an alteration (NG) to the block-division unit 306. In this case, the units perform the same processes as those of the units with the same names in FIG. 2 only for an altered frame pair TPP.

The inter-block-magnitude-relation-information-calculation unit 309 calculates inter-block-magnitude-relation information RB'. A cell-division unit 310, a cell-coefficient-calculation unit 311, a cell-pair-selection unit 312, and an inter-cell-magnitude-relation-information-calculation unit 313 perform processing only when the verification unit 314 inputs an altered block pair TPB to the cell-division unit 310. In this case, the units perform the same processes as those of the units with the same names in FIG. 2 only for the altered block pair TPB. The inter-cell-magnitude-relation-information-calculation unit 313 calculates inter-cell-magnitude-relation information RS'.

The verification unit 314 receives the inter-frame-magnitude-relation information RP', the inter-block-magnitude-relation information RB', the inter-cell-magnitude-relation information RS', the verification data S(RP), S(RB), and S(RS) extracted by the image input unit 301, and a verification key KS. Using the received data, the verification unit 314 verifies whether the image data I' is altered, and outputs the verification result (OK/NG), the altered frame pair TPP, altered block pair TPB, and the alteration position TPS. The arrangement of the image-verification apparatus 12 according to the second embodiment has been described above.

For the procedure of image verification of the second embodiment, the procedure of the first embodiment shown in FIG. 8 changes as follows.

First, the process target in steps S801 to S805 and step S808 changes from a block to a frame. The decryption target in step S806 changes from S(RB) AND S(RS) to S(RP), S(RB), and S(RS).

The process target in steps S813 to S816 changes from a cell to a block. Finally, as an additional step, the alteration position TPS is specified by comparing RS with RS' for each cell pair of the altered block pair TPB detected in step S816. This allows the user to specify the frame including an altered block pair and know the alteration position in the frame.

In the second embodiment, an alteration presence/absence determination and an alteration-position specifying are executed in three layers, that is, frames, blocks, and cells. However, the present invention is not limited to this. An alteration presence/absence determination and an alteration-position specifying can also be executed in four or five layers by adding another unit (for example, a moving image file including a plurality of frames, or a file group including a plurality of moving image files).

As described above, according to the second embodiment, hierarchical verification data are generated for image data. This allows the apparatus to hierarchically specify alteration positions (in the entire moving image, in each frame, and in each block) different from those of the first embodiment.

In the embodiment, the average of pixel values is used as the image-data coefficient of the first or second unit. However, any other value derivable from the pixel values of the image represented by the first unit (or second unit) is usable.

Third Embodiment

In the first embodiment, alteration-position specifying is performed for the blocks of all block pairs that do not maintain the magnitude relation. However, if the image is altered overall, alteration positions exist overall, and it is supposedly unnecessary for the user to check.

In this case, the verification unit 710 of the image-verification apparatus 12 of the first embodiment switches subsequent processing based on a threshold TH2 and the number of block pairs maintaining the magnitude relation.

If the number of block pairs maintaining the magnitude relation is equal to or more than the threshold TH2, an alteration position is specified, as in the first embodiment. On the other hand, if the number of block pairs maintaining the magnitude relation is less than the threshold TH2, only the presence of an alteration (NG) is output without performing alteration-position specifying, and the processing ends. Note that the user may be notified that "the alteration position is not specified because a predetermined number of alteration positions or more exist" or "the image is altered overall".

According to the above embodiment, when the image is altered overall, alteration-position-specifying processing can be omitted, and the process efficiency can be increased.

Note that as the data to be used to verify the above-mentioned image alteration, data of each unit corresponding to frames, blocks, or cells has been described as verification data. However, the data structure of the verification data can be changed as needed.

For example, the data "necessary for alteration verification", which has been described as verification data corresponding to each unit, may omit the encryption/electronic signature. For example, when finally outputting the verification data, the data of all units (all verification data of the units corresponding to frames, blocks, and cells) may be put together into one verification data outwardly and added to image data.

In the present invention, to facilitate alteration verification in a necessary unit, the verification data of each unit is made accessible at random and independently managed. Hence, the outward data form and the presence/absence of encryption are of little importance.

In the embodiments, a digital camera has been exemplified as the image input apparatus 11. However, the present invention is also applicable to original reading by an information processing apparatus including an image scanner. Hence, the image input apparatus is not limited to a digital camera.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-296390, filed Dec. 25, 2009, and No. 2010-230700, filed on Oct. 13, 2010, which are hereby incorporated by reference herein in their entirety.

What is claimed is:

1. An information processing apparatus for generating, from image data, verification information to be used to certify the integrity of the image data, comprising:
   an image input unit which inputs the image data as an integrity certification target;
   a block division unit which divides the image data input by said image input unit into blocks, each represented by a predetermined number of pixels;
   a block coefficient calculation unit which performs a calculation to obtain, for values of pixels included in each block, a block coefficient representing a feature of the block;
   a cell division unit which divides each of the blocks divided by said block division unit into cells, each having a size smaller than that of its block;
   a cell coefficient calculation unit which performs a calculation to obtain, for values of pixels included in each cell, a cell coefficient representing a feature of the cell;
   a first verification data generation unit which generates first verification data by selecting, from the block coefficients obtained by said block coefficient calculation unit, two block coefficients which form a block pair and generating data representing a magnitude relation of the two block coefficients which form the selected block pair;

a second verification data generation unit which generates second verification data by selecting the cell coefficients corresponding to two cells at preset positions so as to select a cell pair and generating data representing a magnitude relation of the two cell coefficients which form the selected cell pair; and an output unit which outputs the image data as the integrity certification target input by said image input unit, and outputs the first verification data obtained by said first verification data generation unit and the second verification data obtained by said second verification data generation unit as the verification information for the image data as the integrity certification target.

2. The apparatus according to claim 1, wherein said second verification data generation unit generates the second verification data by selecting the cell coefficients corresponding to two cells at preset positions of different blocks so as to select the cell pair and generating the data representing the magnitude relation of the two cell coefficients which form the selected cell pair.

3. The apparatus according to claim 1, wherein said block coefficient calculation unit executes one of calculation of an average, calculation of a median value, and calculation of a variance of pixel values included in the block.

4. The apparatus according to claim 1, wherein said cell coefficient calculation unit executes one of calculation of an average, calculation of a median value, and calculation of a variance of pixel values included in the cell.

5. A verification apparatus for verifying the presence/absence of an alteration of image data based on the image data and verification information for the image data, comprising:

an input unit which inputs the image data as a verification target and the verification information for the image data;

a block division unit which divides the image data input by said input unit into blocks, each represented by a predetermined number of pixels;

a block coefficient calculation unit which performs a calculation to obtain, for values of pixels included in each block, a block coefficient representing a feature of the block;

a cell division unit which divides each of the blocks divided by said block division unit into cells, each having a size smaller than that of its block;

a cell coefficient calculation unit which performs a calculation to obtain, for values of pixels included in each cell, a cell coefficient representing a feature of the cell;

a first determination unit which, by selecting, from the block coefficients obtained by said block coefficient calculation unit, two block coefficients which form a block pair, generating data representing a magnitude relation of the two selected block coefficients which form the block pair, and comparing the generated data with first verification data included in the verification information input by said input unit, determines the absence of an alteration of the image data if the comparison result of the comparison indicates that the generated data and the first verification data are equal, or determines the presence of an alteration of the image data if the comparison result indicates that the generated data and the first verification data are not equal; and a second determination unit which, if said first determination unit has determined the presence of an alteration, by selecting the cell coefficients corresponding to two cells at preset positions so as to select a cell pair, generating data representing a magnitude relation of the two cell coefficients which form the selected cell pair, and comparing the generated data representing the magnitude relation of the two selected cell coefficients with second verification data included in the verification information input by said input unit, determines the absence of an alteration in the block of the selected cell pair if a comparison result of the comparison indicates that the second verification data and the generated data representing the magnitude relation of the two cell coefficients are equal, or determines the block of the selected cell pair contains an alteration if the comparison result indicates that the second verification data and the generated data representing the magnitude relation of the two cell coefficients are not equal.

6. A method of controlling an information processing apparatus for generating, from image data, verification information to be used to certify the integrity of the image data, comprising:

an image input step of inputting the image data as an integrity certification target;

a block division step of dividing the image data input in the image input step into blocks, each represented by a predetermined number of pixels;

a block coefficient calculation step of performing a calculation to obtain, for values of pixels included in each block, a block coefficient representing a feature of the block;

a cell division step of dividing each of the blocks divided in the block division step into cells, each having a size smaller than that of its block;

a cell coefficient calculation step of performing a calculation to obtain, for values of pixels included in each cell, a cell coefficient representing a feature of the cell;

a first verification data generation step of generating first verification data by selecting, from the block coefficients obtained in the block coefficient calculation step, two block coefficients which form a block pair and generating data representing a magnitude relation of the two block coefficients which form the block pair;

a second verification data generation step of generating second verification data by selecting the cell coefficients corresponding to two cells at preset positions so as to select a cell pair and generating data representing a magnitude relation of the two cell coefficients which form the selected cell pair; and an output step of outputting the image data as the integrity certification target input in the image input step, and outputting the first verification data obtained in the first verification data generation step and the second verification data obtained in the second verification data generation step as the verification information for the image data as the integrity certification target.

7. The method according to claim 6, wherein in the second verification data generation step, the second verification data is generated by selecting cell coefficients corresponding to two cells at preset positions of different blocks so as to select the cell pair and generating the data representing the magnitude relation of the two cell coefficients which form the selected cell pair.

8. A method of controlling a verification apparatus for verifying the presence/absence of an alteration of image data based on the image data and verification information for the image data, comprising:

an input step of inputting the image data as a verification target and the verification information for the image data;

a block division step of dividing the image data input in the input step into blocks, each represented by a predetermined number of pixels;

a block coefficient calculation step of performing a calculation to obtain, for values of pixels included in each block, a block coefficient representing a feature of the block;

a cell division step of dividing each of the blocks divided in the block division step into cells, each having a size smaller than that of the block;

a cell coefficient calculation step of performing a calculation to obtain, for values of pixels included in each cell, a cell coefficient representing a feature of the cell;

a first determination step of, by selecting, from the block coefficients obtained in the block coefficient calculation step, two block coefficients which form a block pair, generating data representing a magnitude relation of the two block coefficients which form the block pair, and comparing the generated data with first verification data included in the verification information input in the input step, determining the absence of an alteration if a comparison result of the comparison indicates that the generated data and the first verification data are equal, or determines the presence of an alteration if the comparison result indicates that the generated data and the first verification data are not equal; and a second determination step of, if the presence of an alteration is determined in the first determination step, by selecting the cell coefficients corresponding to two cells at preset positions so as to select a cell pair, generating data representing a magnitude relation of the two selected cell coefficients which form the selected cell pair, and comparing the generated data representing a magnitude relation of the two selected cell coefficients with second verification data included in the verification information input in the input step, determining the absence of an alteration in the block of the selected cell pair if a comparison result of the comparison of the generated data representing the magnitude relation of the two selected cell coefficients with the second verification data indicates that the second verification data and the generated data representing the magnitude relation of the two cell coefficients are equal, or determining that the block to which the selected cell pair belongs contains an alteration if the comparison result indicates that the second verification data and the generated data representing the magnitude relation of the two cell coeffients are not equal.

9. A non-transitory computer-readable storage medium storing a program which is read out and executed by a computer so as to cause the computer to function as units of an information processing apparatus of claim 1.

10. A non-transitory computer-readable storage medium storing a program which is read out and executed by a computer so as to cause the computer to function as units of a verification apparatus of claim 5.

* * * * *